United States Patent [19]
Mishima et al.

[11] Patent Number: 5,185,679
[45] Date of Patent: Feb. 9, 1993

[54] INVERSION PHENOMENON PREVENTING CIRCUIT

[75] Inventors: Hidetoshi Mishima; Keiji Hatanaka, both of Nagaokakyo, Japan

[73] Assignee: Mitsubishi Denki Kabushiki Kaisha, Tokyo, Japan

[21] Appl. No.: 350,252

[22] Filed: May 11, 1989

[30] Foreign Application Priority Data

May 12, 1988 [JP] Japan ................................ 63-117721
Feb. 2, 1989 [JP] Japan ................................ 1-26023
Apr. 17, 1989 [JP] Japan ................................ 1-98137

[51] Int. Cl.⁵ ...................... G11B 20/06; H04N 5/178
[52] U.S. Cl. ...................................... 360/30; 360/33.1
[58] Field of Search ............... 360/30, 33.1; 358/330, 358/38; 369/59, 60; 329/341; 375/82; 328/120; 455/337; 307/354, 471

[56] References Cited

U.S. PATENT DOCUMENTS

| 3,656,064 | 4/1972 | Giles et al. | 375/82 |
| 4,016,599 | 4/1977 | Sherer | 360/53 |
| 4,017,801 | 4/1977 | Riedel | 307/471 |
| 4,115,820 | 9/1978 | Morio et al. | 360/30 |
| 4,123,625 | 10/1978 | Chow | 375/18 |
| 4,470,080 | 9/1984 | Kimura | 360/30 |
| 4,597,021 | 6/1986 | Yamamitsu et al. | 360/30 |
| 4,737,862 | 4/1988 | Koga | 358/314 |
| 4,994,928 | 2/1991 | Honjo et al. | 360/33.1 |

FOREIGN PATENT DOCUMENTS 56-27927 6/1981 Japan .

Primary Examiner—John H. Wolfe
Assistant Examiner—Won Tae C. Kim

[57] ABSTRACT

An FM signal which is partly missing zero crossing points is supplied to an input terminal, to which a second polarity discriminating circuit and a lower side band suppressing circuit followed by a first polarity discriminating circuit are coupled together. A pulse extracting circuit receives the outputs of the first polarity discriminating circuit and a second polarity discriminating circuit to produce pulses corresponding only to portions of the FM signal at which the zero crossing points are absent. The pulses thus obtained are subsequently combined in a waveform reforming circuits with the FM signal from the input terminal, thereby permitting the FM signal to regain the zero crossing points.

105 Claims, 27 Drawing Sheets

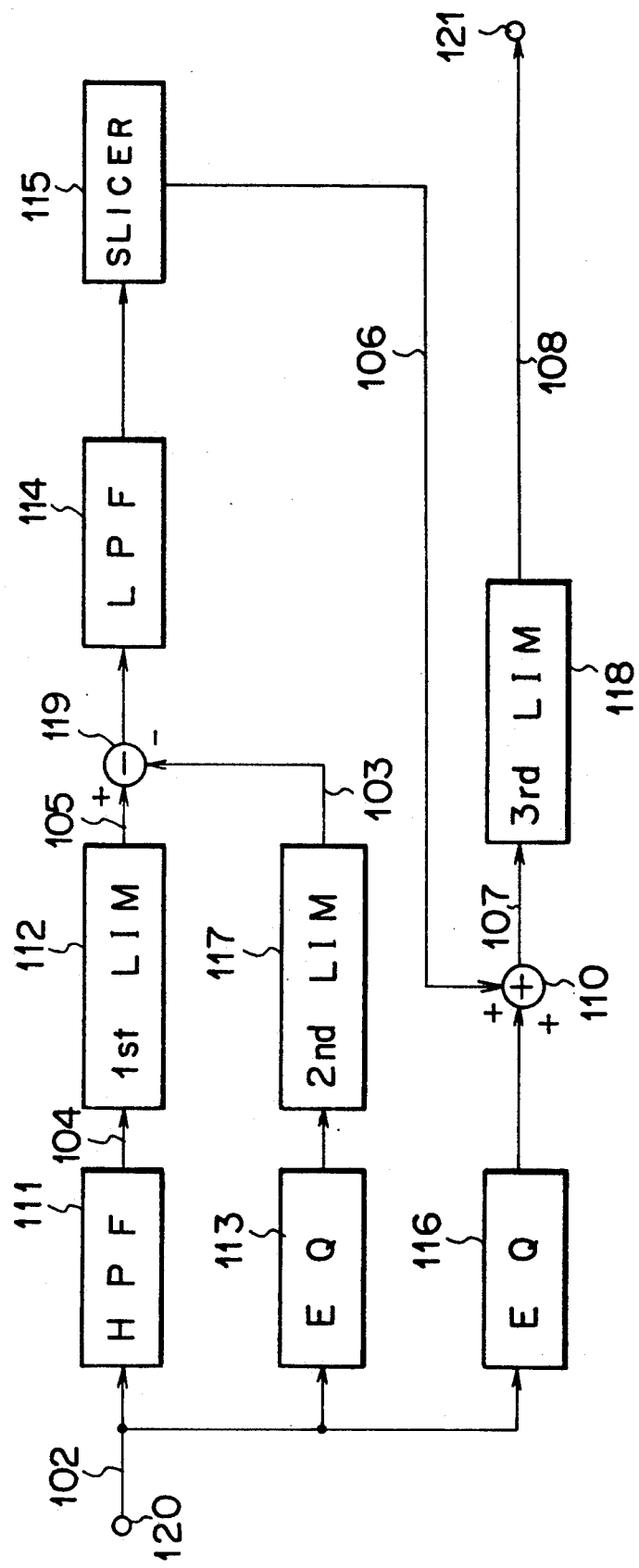

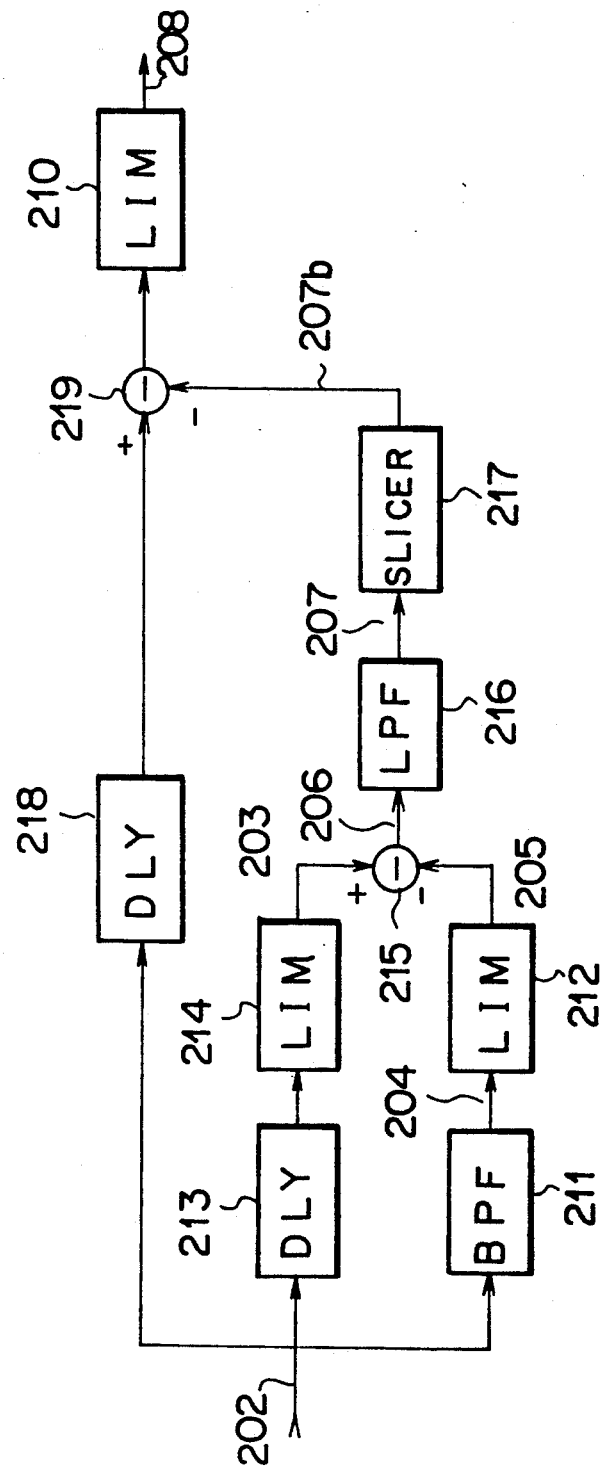

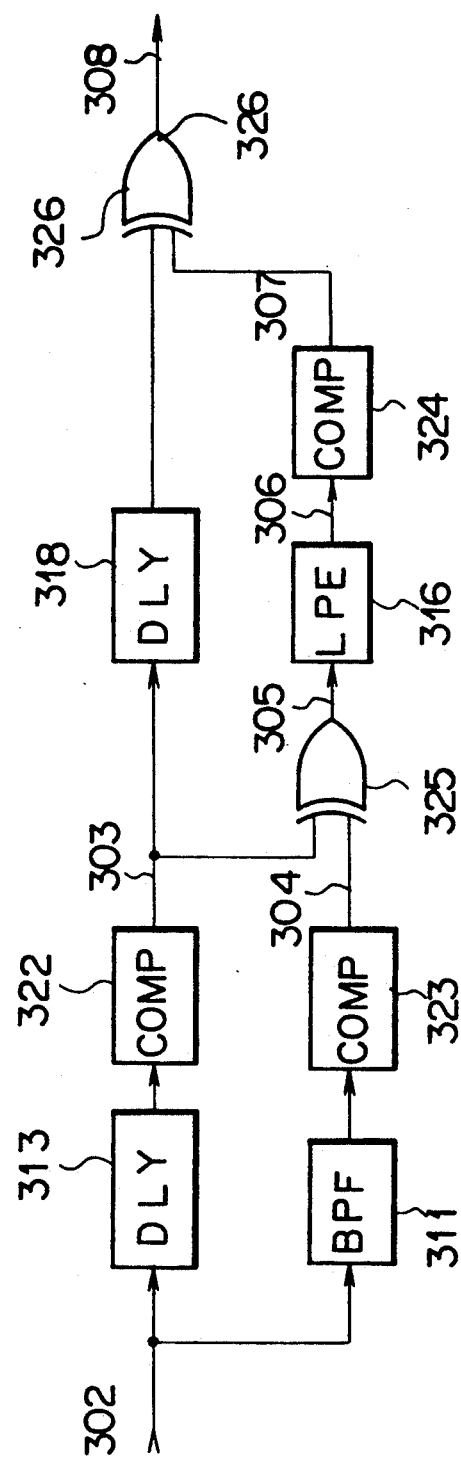
F I G. 7

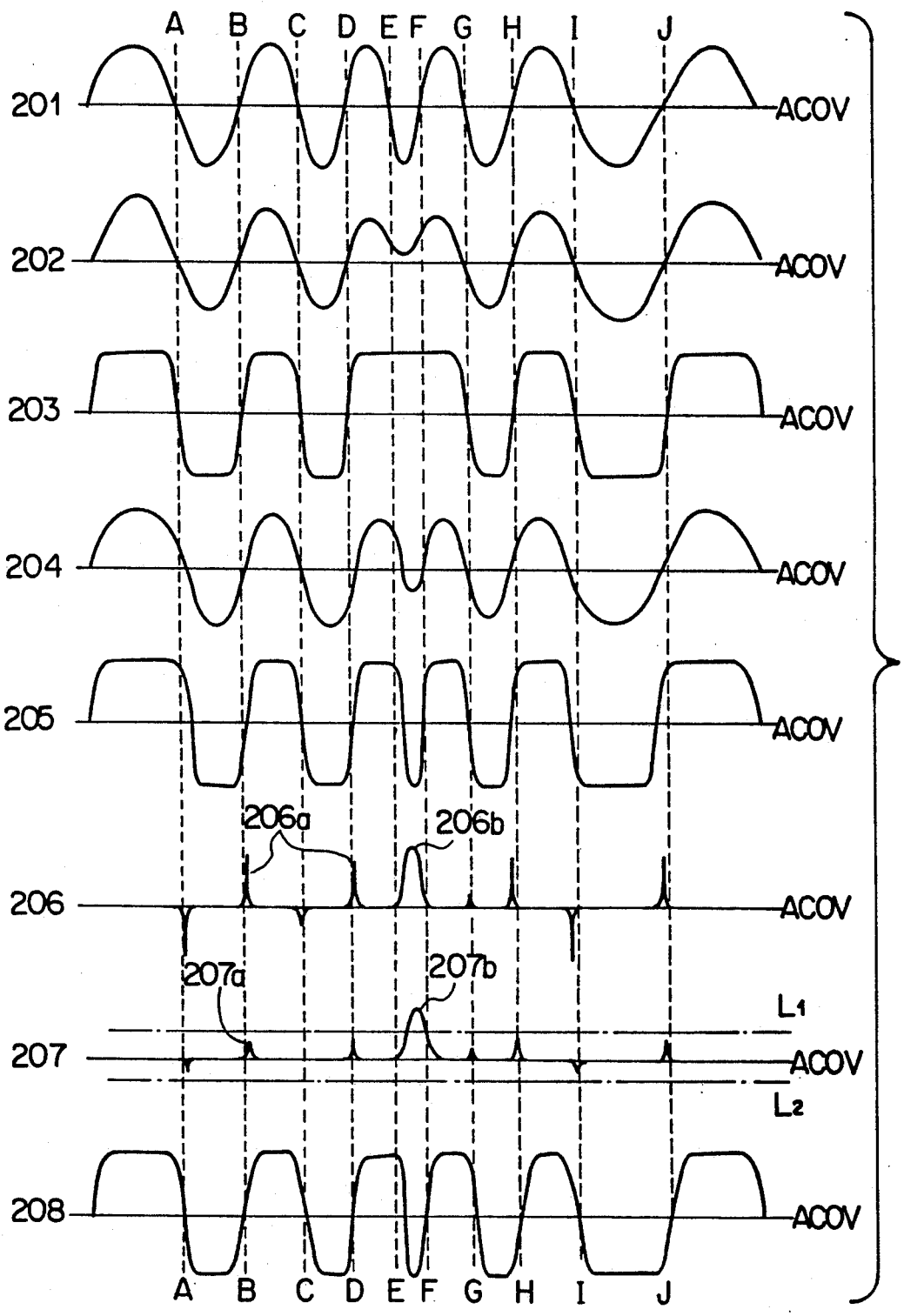

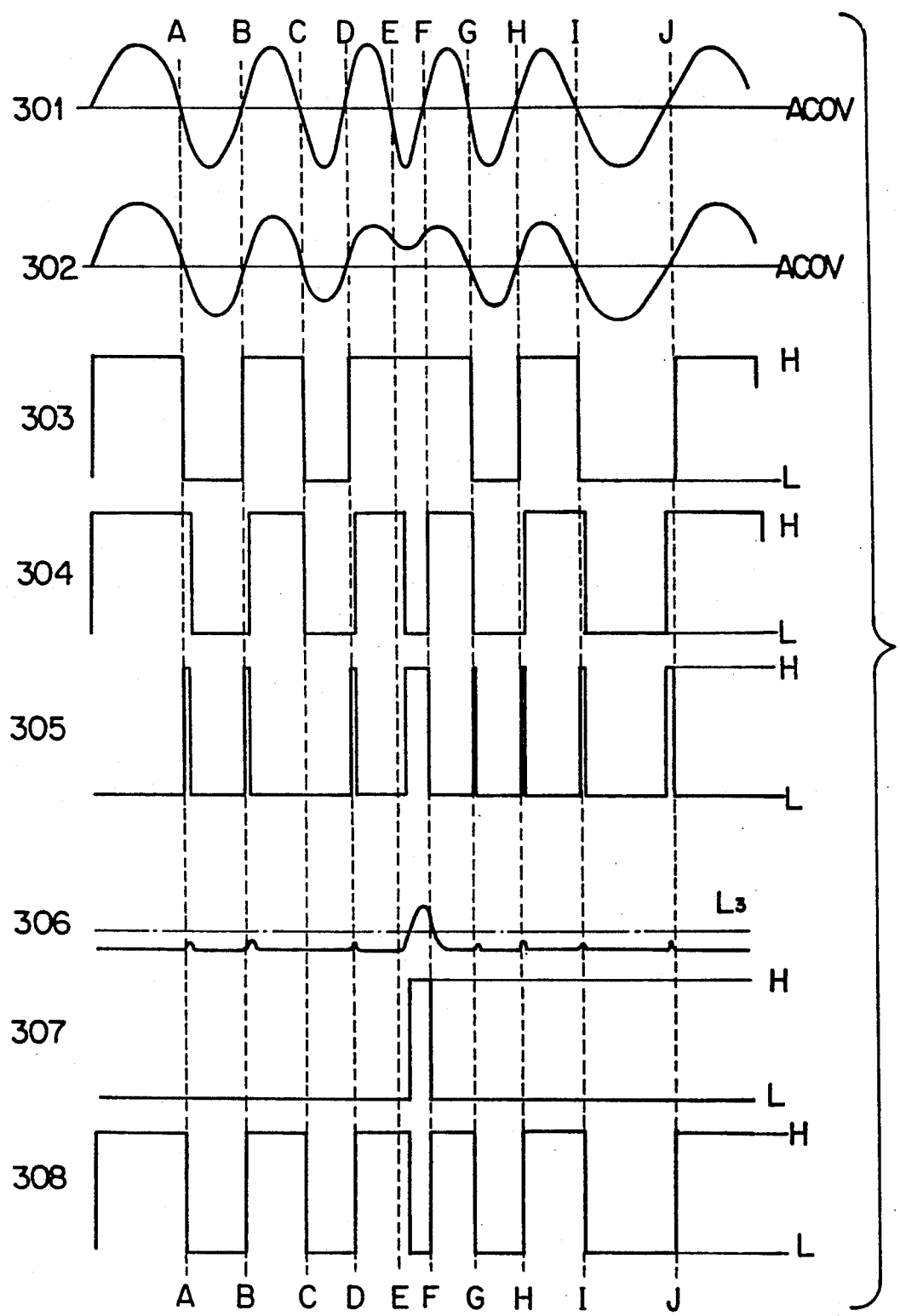

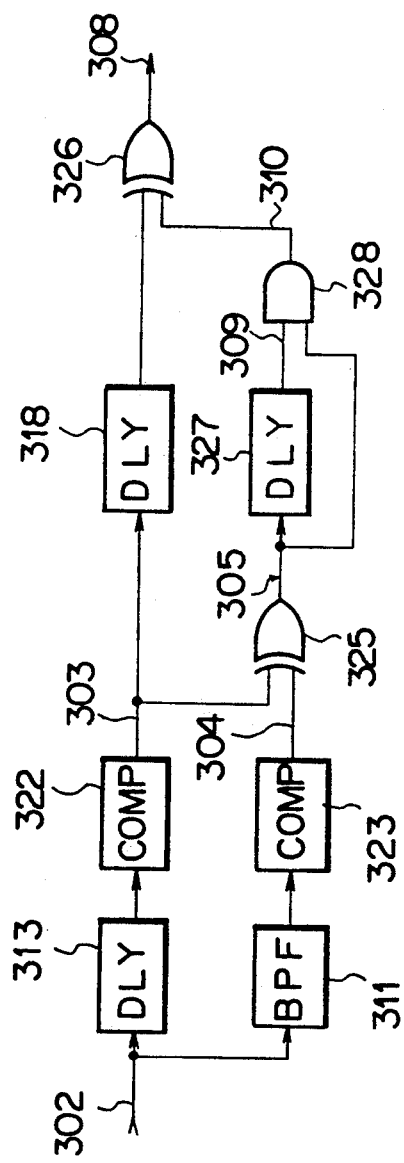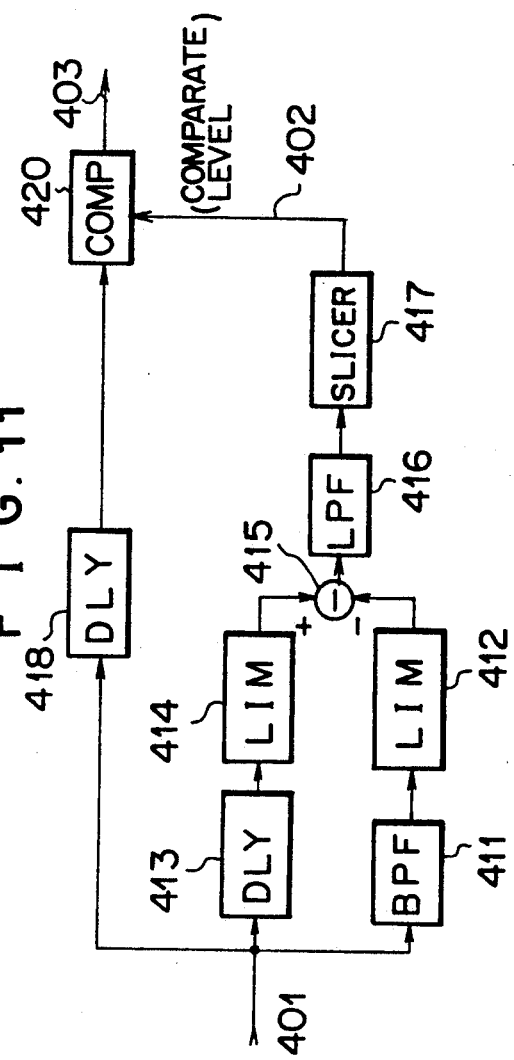

INVERSION PHENOMENON

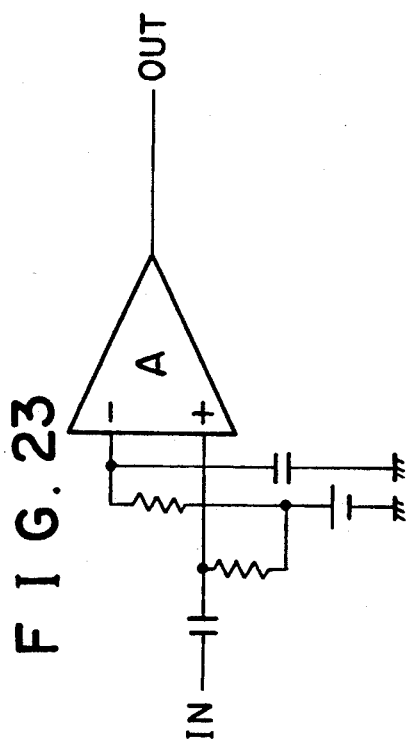
F I G. 23
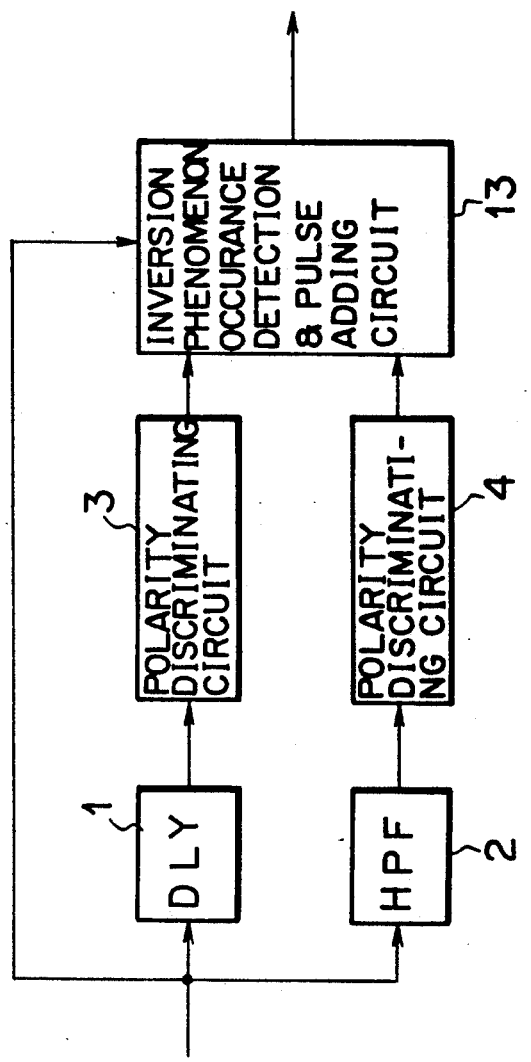
F I G. 24

F I G. 26a
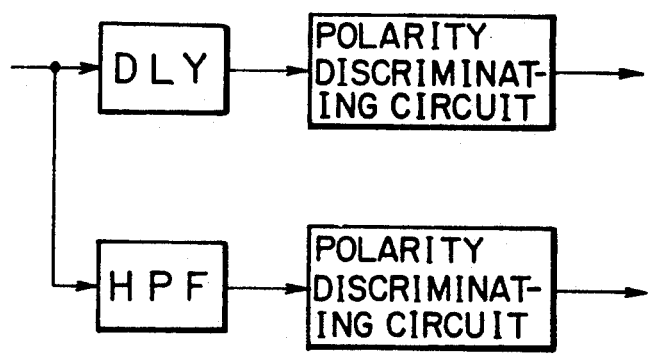
F I G. 26b
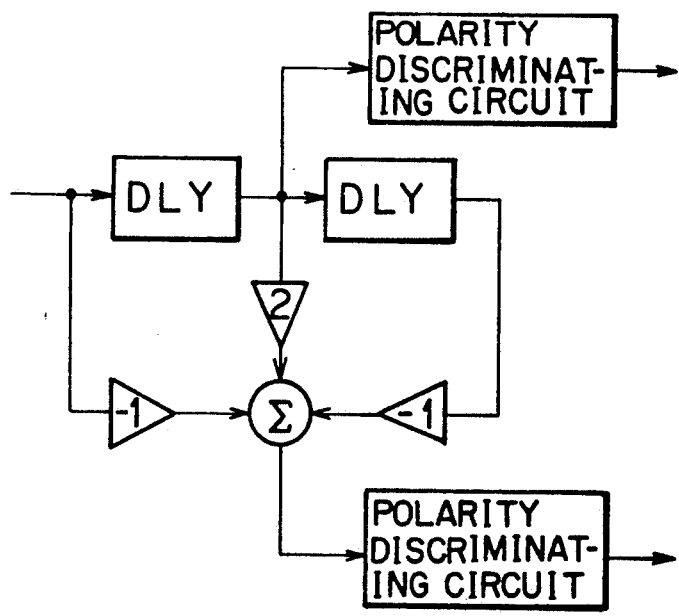

ONE SIDE SLICER

OUTPUT = MAX($E_2$, $E_1 + e_1$)

DOUBLE SIDE SLICER

OUTPUT = MAX($E_2$, $E_1 + e_1$)
         + MIN($E_3$, $E_1 + e_1$)

WAVEFORM AT Ⓐ

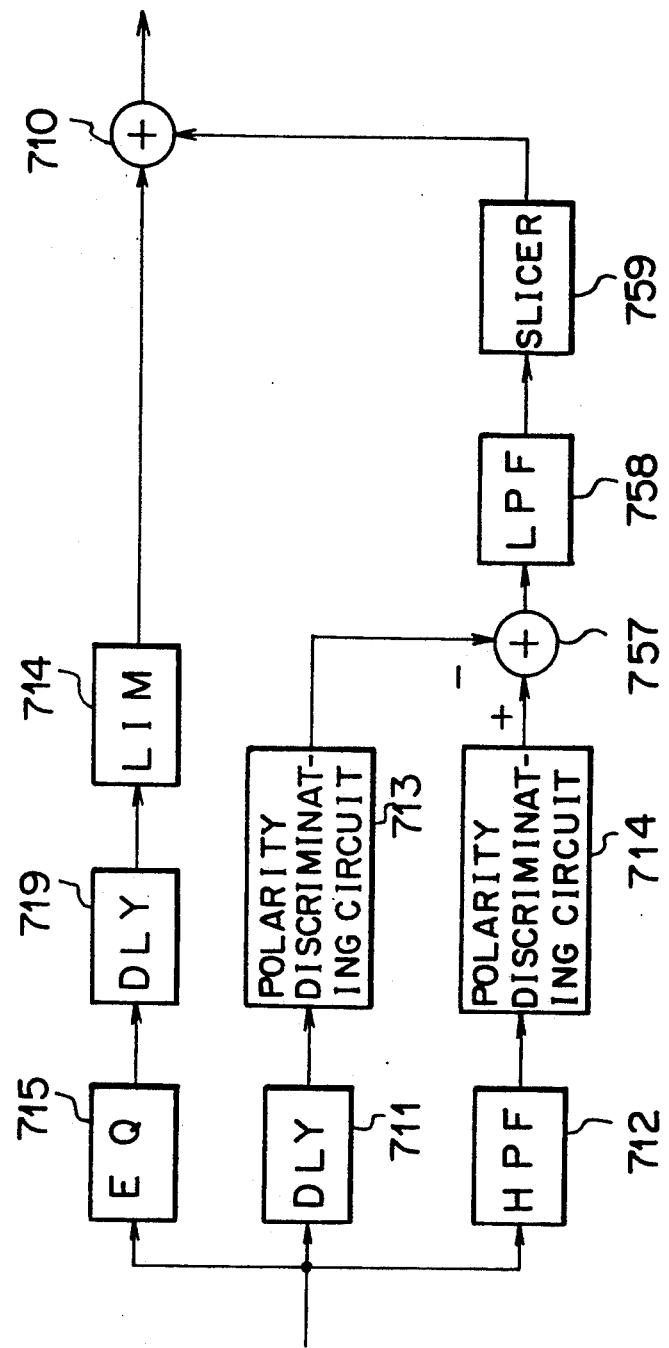

INVERSION PHENOMENON PREVENTING CIRCUIT

BACKGROUND OF THE INVENTION

1. Field of the Invention

The present invention relates to an inversion phenomenon preventing circuit of a video recorder/reproducer in which a video signal is stored and reproduced through frequency modulation, and more particularly to a circuit for recovering the absence of zero crossing in an FM signal reproduced from a storage medium in the video recorder/reproducer.

2. Prior Art

FIG. 15 is a block diagram for illustrating a reproduction system of a conventional video signal storage/reproduction apparatus. A very small FM signal, reproduced from a magnetic tape 29 by means of a video head 30, is amplified by an amplifier 31 and is corrected frequency response thereof by an RF equalizer 32. The FM signal from the equalizer 32 is amplitude limited by a limiter circuit 33 and is frequency demodulated by an FM demodulator 34. Then the demodulated signal is fed to a de-emphasis circuit 35 to produce a video signal.

Generally, a normal video signal, as depicted by a waveform shown in FIG. 19b, which varies from a black level to a white level, produces a picture on a CRT as depicted in FIG. 19d. An abnormal video signal, as depicted by a waveform shown in FIG. 19a distorted by so-called "inversion phenomenon," will cause a picture as depicted by a illustration of FIG. 19c. This is explained as follows.

In the video storage/reproduction apparatuses, the lower side band of the FM signal is emphasized due to electromagnetic transducing characteristics. The limiter circuit 33 in FIG. 15 functions to detect the zero crossing points of the signal therethrough. If an absence of the zero crossing points exists in the signal, then an abnormal FM signal will appear at the output of the limiter circuit 33. When the limiter output is demodulated, an abnormal video signal having an abrupt drop in level will be produced as depicted by the waveform in FIG. 19a.

One prior art inversion phenomenon preventing circuit for preventing the inversion phenomenon is a circuit called DL-FM method described on p 98–100 in "NHK home video techniques" written by Katsuya Yokoyama, published by Nippon Hoso Shuppan Kyokai. FIG. 16 is a block diagram of such an inversion phenomenon preventing circuit according to the DL-FM method. FIG. 18 is a waveform diagram for showing waveforms at various points of the block diagram in FIG. 16.

A normal FM signal (i) in FIG. 18 is an original FM signal to be stored, in which points A to J indicate the time at which the zero crossing points are supposed to exist. The signal (i) is more emphasized at the lower side band thereof than the upper side band thereof, as shown by a signal (ii) due to lower side band emphasis effect encountered when the signal (i) passes through the electromagnetic transducing system. It should be noted that the reproduced FM signal (ii) is missing zero crossing at points E and F. This absence of the zero crossing points will cause the previously described inversion phenomenon. In the mean time, a signal (iii) exiting through a high pass filter, or HPF 36 has been emphasized upper side band thereof, there being no absence of the zero crossing at points E and F. The signal (iii) is amplitude limited by the limiter 37 to thereby produce a signal (iv) in FIG. 18. However, it should be noted that the signal (iv) has its zero crossing points at positions in time axis slightly shifted from those of the original FM signal (i). The shift in zero crossing points is also caused by another source which will be described later. The shift in zero crossing points is a source of deteriorated SN ratio in the video signal when the FM signal is demodulated. The signal (ii) is also input to a low pass filter or LPF 39 and is emphasized its lower side band, resulting in a signal (v) which has a very little shift in zero cross points. The signal (iv) and the signal (v) are aligned by an equalizer 38 so that their phase is equal with respect to each other and are then added by an adding circuit 40, thereby producing a signal (vi). The signal (vi) now has less shift in zero cross points caused by noise as compared to the signal (iv), indicating that SN ratio of the video signal obtained will be better in demodulating the signal (vii) than in demodulating the signal (iv). Having a deteriorated SN ratio thereof by the HPF 36 that suppresses lower frequencies, the signal from the equalizer 38 is added by the adding circuit 40 to the signal (v). Thus adding these two signals places a limitation on the improvement of SN ratio of the reproduced video signal, though the circuit arrangement in FIG. 16 can provide better SN ratio than a circuit arranged only with the HPF 36 and the limiter 37. In other words, if recovery of the missing zero crossing points in the reproduced FM signal is a first consideration, then the SN ratio of the video signal will be poor; conversely if improving the SN ratio is a primary importance then the missing zero crossing points will not be adequately recovered.

The shift in zero crossing points is also caused if the frequency response characteristic of an FM transmission line is not flat. The frequency response of the FM transmission system varies, particularly in the DL-FM method, in accordance with the ratio of the level of the output from the LPF 39 to the level of the signal through the HPF 36 and the limiter circuit 37, thus causing shift in zero crossing points. Such a shift in zero crossing points is a source of changes in the frequency characteristic of the demodulated video signal which in turn causes a distorted video signal. Also, a change in the level ratio of the signals to be added causes a change in effect of suppressing the inversion phenomenon, which in turn causes a change in the frequency response characteristic of the demodulated video signal and distortion thereof.

SUMMARY OF THE INVENTION

An object of the present invention is to provide an inversion phenomenon preventing apparatus in which zero cross points can be sufficiently recovered, further the deterioration of the SN ratio of an FM demodulated signal can be minimized.

In the invention, an FM signal, which is partly missing zero crossing points thereof, is supplied to an input terminal, to which a second polarity discriminating means and a lower side band suppressing means followed by a first polarity discriminating means are coupled together. A pulse extracting means receives the outputs of the first polarity discriminating means and a second polarity discriminating means to produce pulses corresponding only to portions of the FM signal at which the zero crossing points are absent. The pulses thus obtained are combined in a waveform reforming means with the FM signal from the input terminal, thereby causing the FM signal to regain the zero crossing points once lost.

The pulse extracting means may further comprise an integration means for integrating the pulses to produce signals having amplitude substantially proportional to pulse widths of the pulses. The waveform reforming means may be constructed by a comparator having a threshold level that varies in accordance with the amplitude of the output of the integration means. Thereby, the waveform reforming means produces an FM signal that has optimally regained the missing zero cross points in accordance with the amount of shift of the zero crossing points from the time at which the FM signal is supposed to cross the zero level.

An apparatus of the invention may conveniently comprise a polarity control means for converting the pulses from the pulse extracting means into pulses having polarity in accordance with polarity of the portion of the FM signal in which the zero crossing points are absent.

BRIEF DESCRIPTION OF THE DRAWINGS

Features and details of the invention will be apparent from the following description of specific embodiments with reference to the accompanying drawings in which:

FIG. 3 shows a modification of the first embodiment;

FIG. 5 illustrates a second embodiment of the invention;

FIG. 7 shows a third embodiment of the invention;

FIG. 8 is a waveform diagram for showing waveforms at various points in FIG. 5;

FIG. 9 is a waveform diagram for showing waveforms at various points in FIG. 7;

FIG. 10 shows another example of the third embodiment;

FIG. 11 shows a fourth embodiment of the invention;

FIGS. 22 and 23 show specific embodiments of the polarity decision circuits 522,523;

FIG. 24 shows a block diagram of an example of an inversion phenomenon detecting & pulse adding circuit;

FIG. 26a shows polarity discriminating circuits preceded by a delay circuit and a high pass filter, respectively;

FIG. 26b shows an example of a lower side band suppressing means using sine-type filters.

FIG. 31 and FIG. 32 show another examples of the arrangement in FIG. 29b using the subtracter and the adder instead of the exclusive OR circuits.

DESCRIPTION OF THE PREFERRED EMBODIMENTS

First Embodiment

Figure 1:
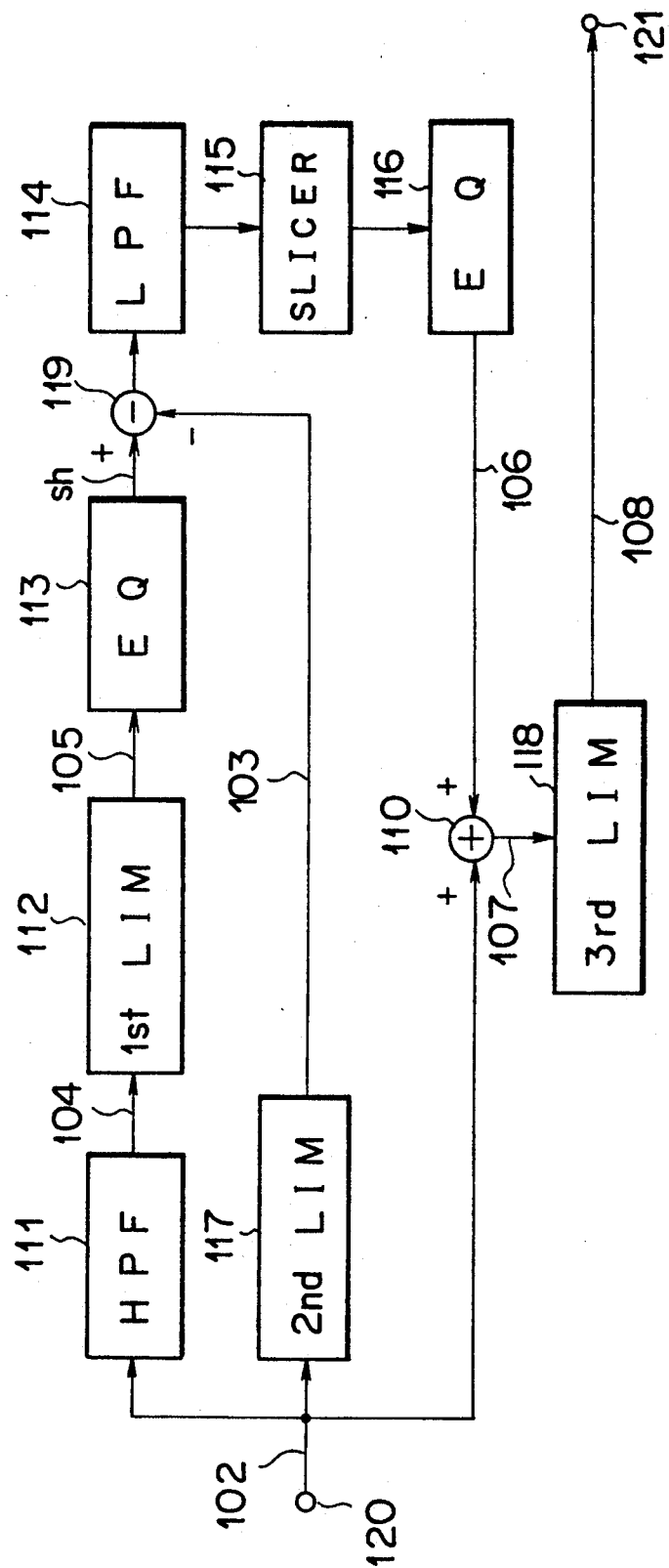
FIG. 1 is a block diagram for illustrating a first embodiment of an inversion phenomenon preventing apparatus according to the invention.

FIG. 1 is a block diagram for illustrating an embodiment of an inversion phenomenon preventing apparatus according to the invention.

An HPF 111, and a second limiter 117 are coupled together at inputs thereof to an input terminal 120. The output of the HPF 111 is connected to a first limiter 112, which in turn is connected to a first equalizer 113. The output of the equalizer 113 is connected to one input terminal of a subtracter 119 and the output of the second limiter 117 is connected to the other input terminal of the subtracter 119. In the subtracter 119, the signal designated by a negative sign (−) is subtracted from the signal designated by a positive sign (+). The output of the subtracter 119 is fed to one of the input terminals of an adder 110 through an LPF 114, a slicer 115 and, a second equalizer 116. To the other input terminal is supplied the signal at the input terminal 120. The output of the equalizer 116 is supplied to the adder 110. The adder provides an output to a subsequent third limiter 118.

The operation of the first embodiment will now be described as follows with reference to FIG. 2.

Figure 2:
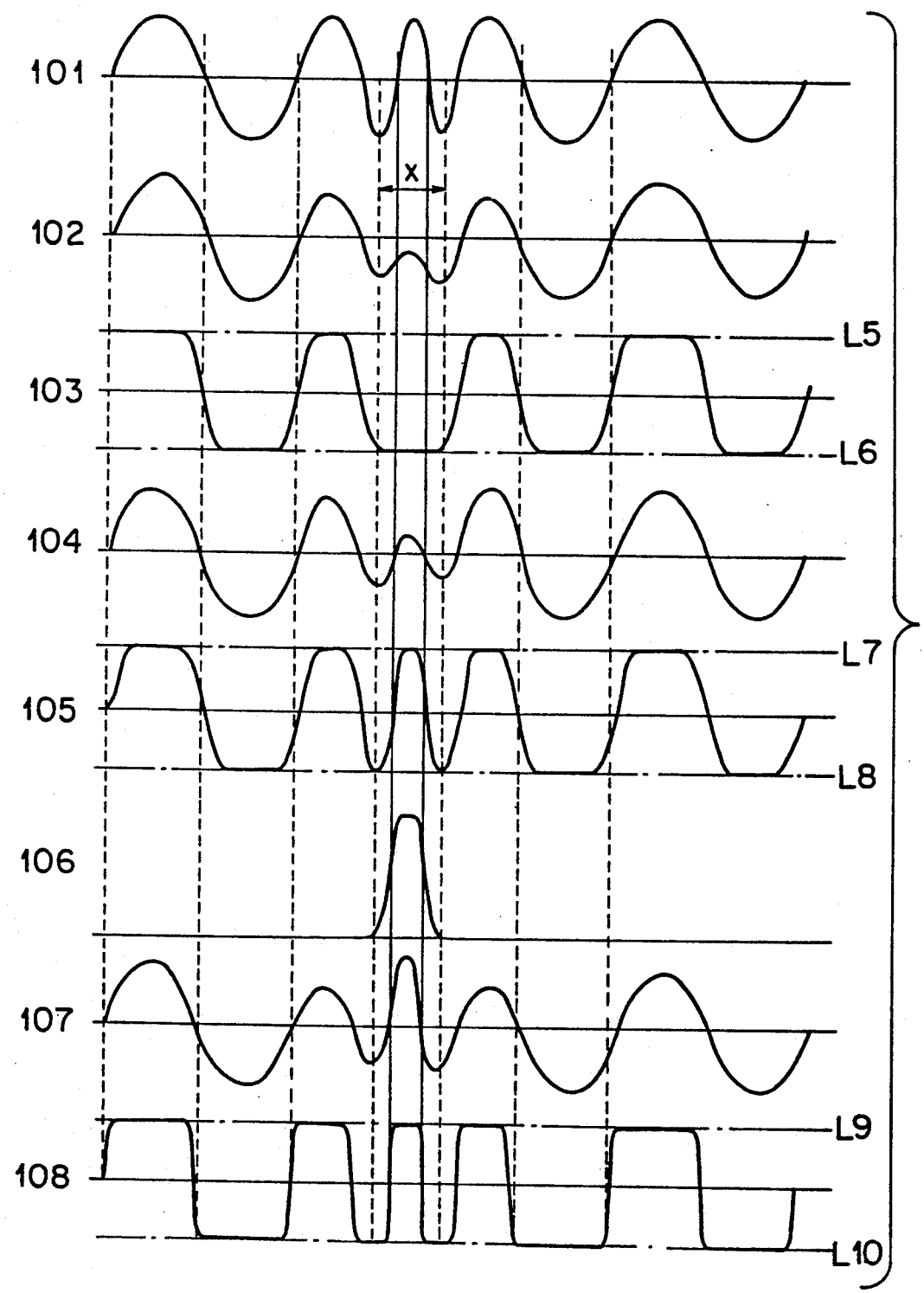
FIG. 2 is a waveform diagram for showing waveforms at various points in FIG. 1.
Figure 4A:
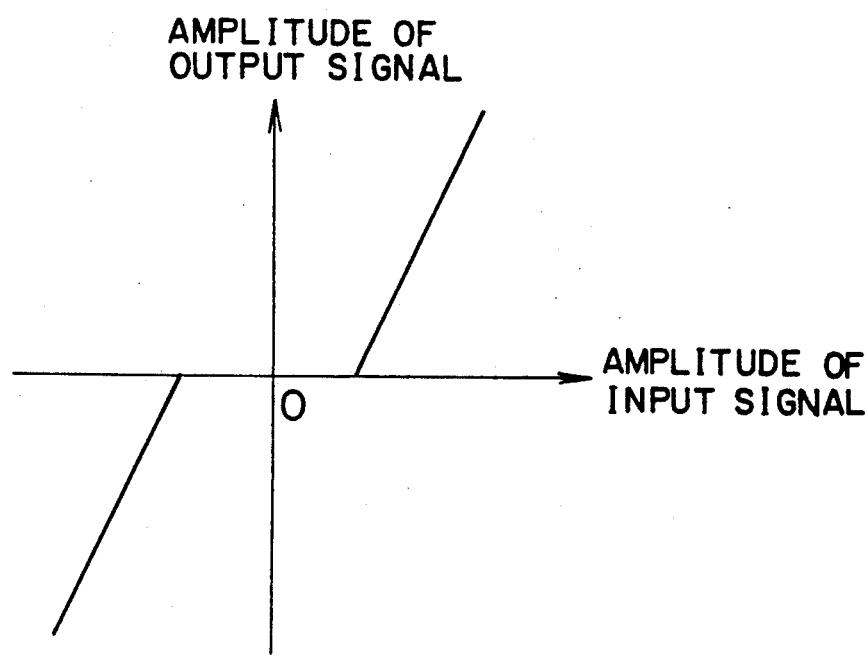
FIGS. 4a and 4b show the characteristics of a slicer in FIGS. 1 and 3.
Figure 4B:
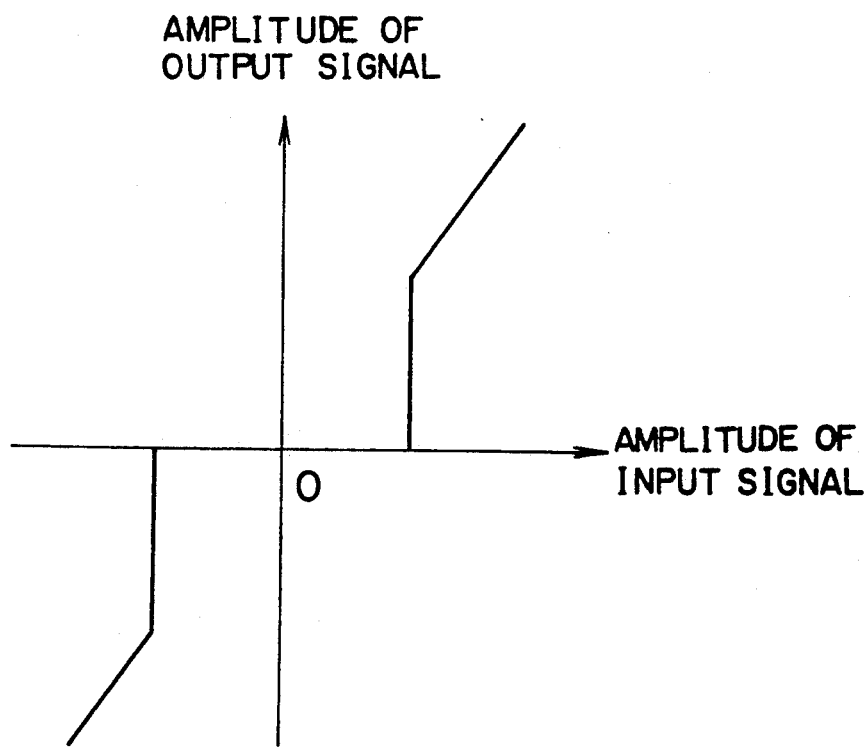

A waveform 101 in FIG. 2 represents a normal FM signal. An FM signal supplied to the input terminal 120 has partially lost zero crossing points at time interval x as shown by a waveform 102 in FIG. 2. The FM signal is supplied to the second limiter 117 to be converted into a waveform 103 as shown, where the zero crossing points are still missing but amplitude is limited at a level L5 and L6. In the mean time, the waveform 102 is also input to the HPF 111 where the zero crossing points absent in the waveform have now been recovered as depicted by a waveform 104. The waveform 104 is fed to the first limiter 112 where the waveform has limited its amplitude at levels L7 and L8 as depicted by a waveform 105. The waveform 105 is supplied to the equalizer 113 to produce a signal sh, the phase of which has been to be in phase with the output of the second limiter or the waveform 103. The subtracter 119 subtracts the waveform 103 from the signal sh to thereby provide the difference between the two. The output of the subtracter is directed to an LPF 114 and then to an equalizer 116 via a slicer 115. Since the signal sh has poor SN ratio, the output of the subtracter has also poor SN ratio. The LPF 114 reduces high frequency components beyond the deviation of the FM signal that cause the poor SN ratio and subsequently the slicer 115, having characteristic in FIG. 4a or FIG. 4b, drops off the reduced high frequency components. Thus, this results in a waveform 106, having a component corresponding only to the portion of the waveform 102, where the zero crossing points are missing.

The output of the slicer 115 is aligned by the equalizer 116 to be in phase with the waveform 102 and is then fed to the adder 110. The waveform 106 is then added to the waveform 102, thereby producing a waveform 107 in which the zero crossing points have been regained at time interval x. A third limiter 118 provides a waveform 108 having its amplitude limited at limiting levels L9 and L10.

In this manner, recovery of the zero crossing points is achieved by producing signal components corresponding only to the portions in the FM signal at which the zero crossing points are absent and then adding the signal components to the FM signal. Thus the SN ratio of the video signal reproduced remains unimpaired while recovery of the zero crossing points is adequately carried out.

Which one of the two inputs to the subtracter 119 is leading in phase relative to the other is up to individual design of the respective blocks. The equalizer 113 serves to align phase relation between the waveforms supplied to the subtracter 119 and to compensate for level frequency response in the transmission line. Thus the equalizer 113 must be placed as shown in FIG. 3 if total amount of delay time of the HPF 111 plus the first limiter 112 is greater than that of the second limiter 117. Likewise, the equalizer 116 may also be placed as shown in FIG. 3.

A band pass filter or BPF may be used in place of the HPF 111, providing that frequencies within the deviation can be passed. Further, the LPF 114 or the slicer 115 may be omitted provided that SN ratio in the video signal reproduced from the FM signal that has regained the missing zero crossing points is not significantly deteriorated.

While FIG. 2 illustrates only a case in which the zero crossing points are absent on the negative swing of the incoming FM signal, the absence of the zero crossing points on the positive swing can also be recovered in like manner, the waveform 106 being a negative value.

Second Embodiment

A second embodiment of the invention will now be described with reference to FIG. 5 and FIG. 8. FIG. 5 illustrates an arrangement of a second embodiment of the invention. FIG. 8 shows waveforms at various points in FIG. 5. A waveform 201 in FIG. 8 is a normal FM signal in which zero crossing points are not absent. An FM signal reproduced by the video signal storage/reproduction apparatus is missing zero crossing points at, for example, points E and F as depicted by a waveform 202 in FIG. 8. The waveform 202 is supplied to a BPF 211 and a delay circuits 213 and 218. A waveform 203 is produced by the delay circuit 213 and a limiter 214 with the zero crossing points being shifted very little from the waveform 202. It should be noted that demodulating the waveform 203 will produce a video signal having good SN ratio but at the same time will cause inversion phenomenon in the video signal.

Figure 14:
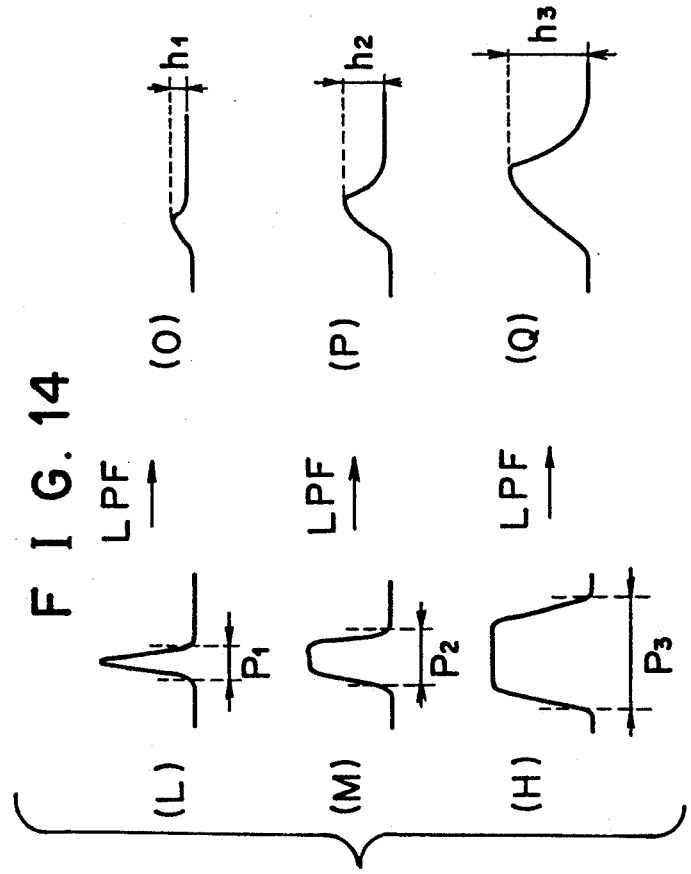
FIG. 14 shows how pulses are converted into signals amplitudes of which are proportional to the pulse widths thereof.
Figure 15:
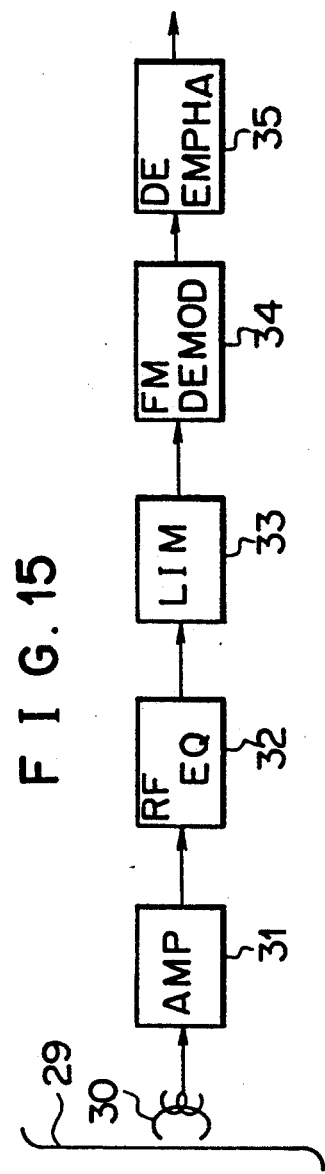
FIG. 15 is a block diagram for showing a conventional video recorder/reproducer.
Figure 16:
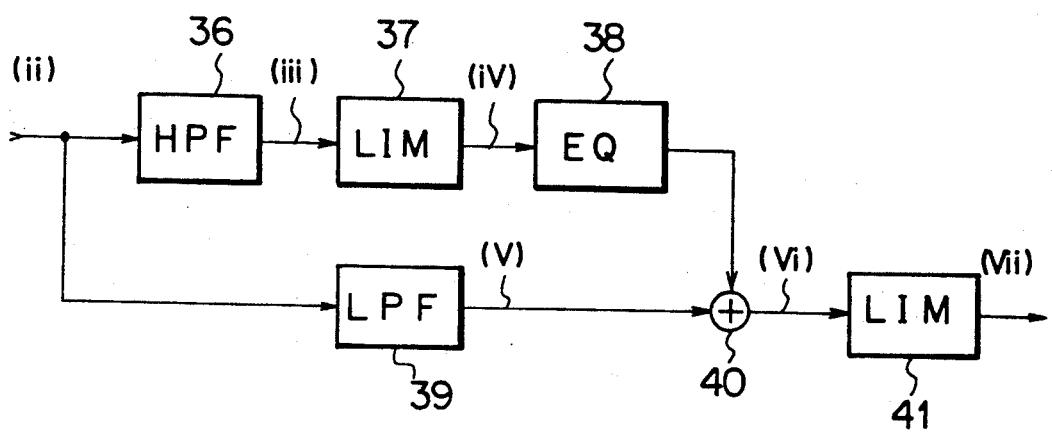
FIG. 16 is a prior art inversion phenomenon preventing system.
Figure 19A:
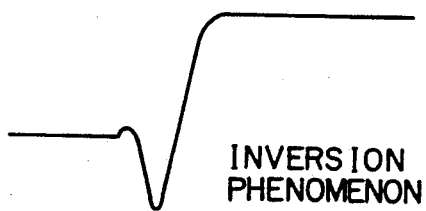
FIGS. 19a and FIG. 19c show a normal video signal and its sample picture on a CRT, respectively.
Figure 19B:
FIG. 19b and FIG. 19d show an abnormal video signal and its sample picture on the CRT, respectively.
Figure 19C:
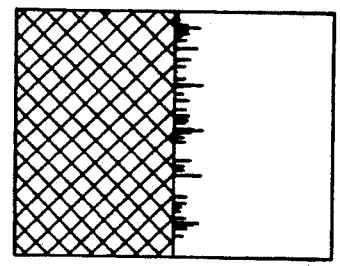
Figure 19D:
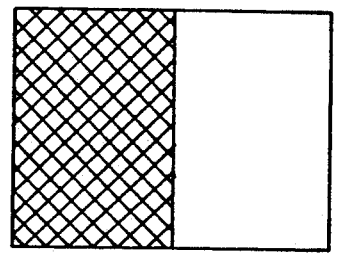

In the mean time, the BPF 211 produces a waveform 204 with all the zero crossing points thereof being present but with the location of the zero crossing points being somewhat shifted from those of the waveform 202. The signal 204 is fed to a limiter 212 to produce a waveform 205. A subtracter 215 subtracts the waveform 205 from the waveform 203 to produce a waveform 206. Narrow pulses 206a are caused by the shift in zero crossing points due to noise while a wider pulse 206b, between the points E and F, is caused by the absence of the zero crossing points at the points E and F. The pulse 206b is of a pulse width nearly equal to the reciprocal of the instantaneous frequency between the points E and F. Thus the waveform 206 is a signal in which the pulses due to noise and the pulse due to missing zero crossing points are coexisting. Thus extracting only the pulse 206b out of the waveform 206 will recover, without causing deterioration of SN ratio, the zero crossing points which have been absent in the reproduced FM signal 202. An LPF 216 and a slicer 217 are circuits for extracting the pulse 206b. The LPF 216 has an integration characteristics by which, for example, pulse signals such as (L), (M), (H) shown in FIG. 14 are integrated to produce pulse waveforms (O), (P), (Q) in FIG. 14, amplitudes h1 to h3 of which being in proportion to the pulse widths p1 to p3. Thus the LPF 216 converts the signal 206 into a signal 207 in which narrow pulses 207a have been sufficiently decreased in their levels. The slicer 217 picks up only pulses having greater amplitudes than a predetermined level (shown by a dashed line L1 and L2) from the signal 207. The pulse picked up by the slicer 217 is subtracted by a subtracter 219 from the signal 202 exiting through the delay circuit 218, and is then supplied to a limiter 210 to produce a waveform 208 as shown in FIG. 8.

Figure 6:
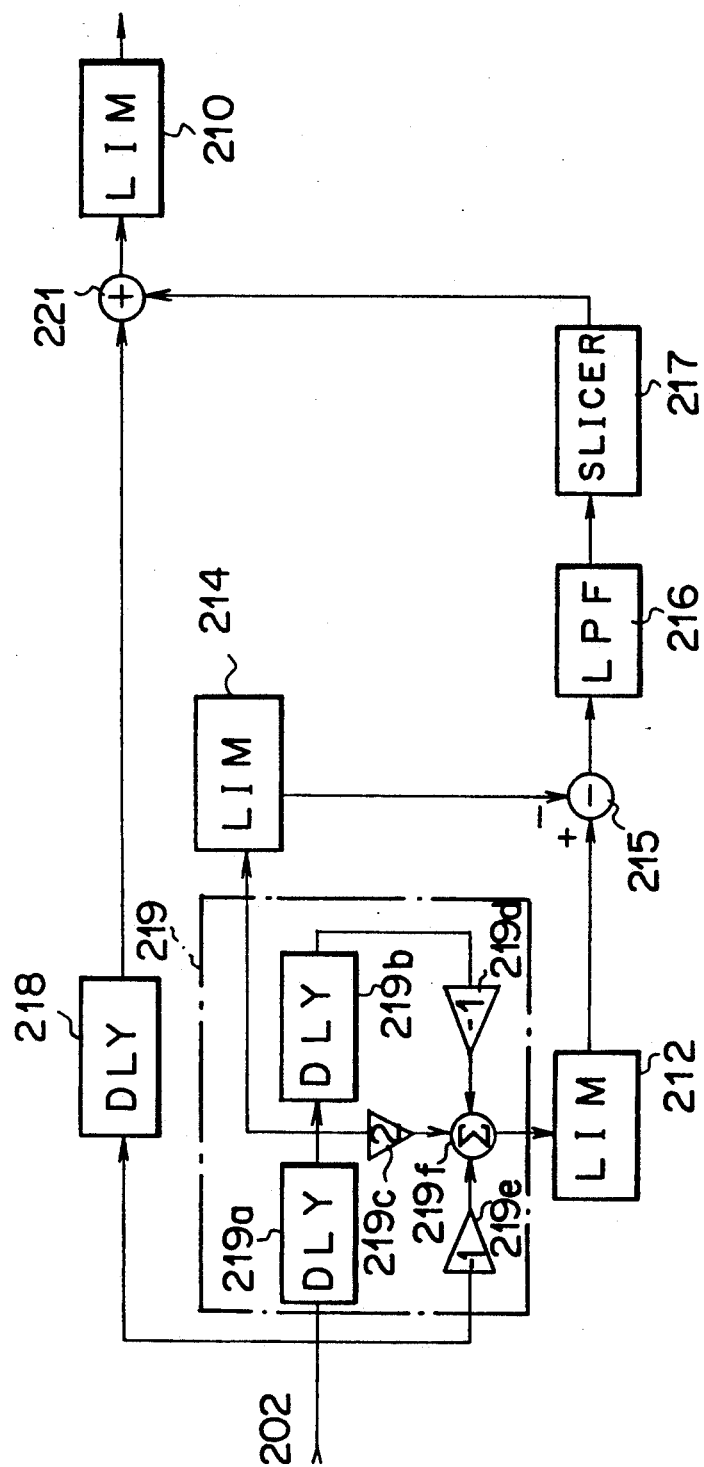
FIG. 6 shows an example of the second embodiment using a sine-type filter as a lower side band suppressing means.

The waveform 208 is an FM signal in which zero crossing points absent at the points E and F in the waveform 202 have been recovered. Unlike the prior art method, an entire FM signal having poor SN ratio is not added to at the signal 202 but only the pulse 207b. Thus not only the SN ratio of the video signal reproduced from the waveform 208 remains unimpaired but also the frequency response of the video signal will not be altered, while at the same time greatly improving effect of suppressing inversion phenomenon. If the BPF 211 is of a sine-type filter that exhibits good phase linearity, the delay circuit 213 is not needed and the inversion phenomenon preventing apparatus can be arranged as shown in FIG. 6. The sine-type filter 219 in FIG. 6 is of a filter similar to an FIR filter and consists of delay circuits 219a, 219b, scalers 219e, 219c, 219d and an adder 219f. The frequency response of the sine-type filter 219 can be changed at will by changing the scaling factors as well as phase adjustment of the filter may be made easily.

In FIG. 6, the adding circuit 221 may be replaced by a subtracter depending on design choice of the polarities, positive or negative, of scaling factors of the sine-type filter 219 and the polarity of the two inputs of the subtracter 215. This is, however, providing that the signals are properly added or subtracted so that zero crossing points can be recovered using the signal 207. Only a single delay circuit is required if the delay circuits 219a, 219b are to be arranged by a delay circuit of reflection type.

Third Embodiment

A third embodiment will now be described as follows with reference to a block diagram in FIG. 7 and waveforms shown in FIG. 9.

A waveform 301 in FIG. 9 is the same as the normal FM signal 201 in FIG. 8. A waveform 302 is the same as the waveform 202 in FIG. 8. The waveform 302 is supplied to a BPF 311 and then to a comparator 323 to provide a waveform 304 in which the zero crossing points, absent at points E and F of the waveform 302, have been recovered with little shift in time axis from the waveform 302. The signal that has passed through the delay circuit 313 and a comparator 322 is of a waveform 303 in which the zero crossing are absent at points E and F. Then the signals 303 and 304 are EX-ORed by an EX-OR circuit 325 to produce a waveform 305. The signal 305 is supplied to an LPF 316 to produce a waveform 306, which in turn is sliced by a comparator 324 at a threshold level indicated by a dashed line L3. The output of the comparator 324 is of a waveform 307 in FIG. 9 and is EX-ORed together with the signal 303 from the delay circuit 318 by an EX-OR circuit 326, thereby providing a waveform 308 with the zero crossovers being recovered at points E and F. In this matter, digital processing can eliminate the limiters 210 in the embodiments shown in FIG. 5 and 6. The LPF 316 and comparator 324 in FIG. 7, for extracting pulses having wider pulse widths, may be replaced by a delay circuit 327 and an AND circuit 328 as shown in FIG. 10.

Figure 12:
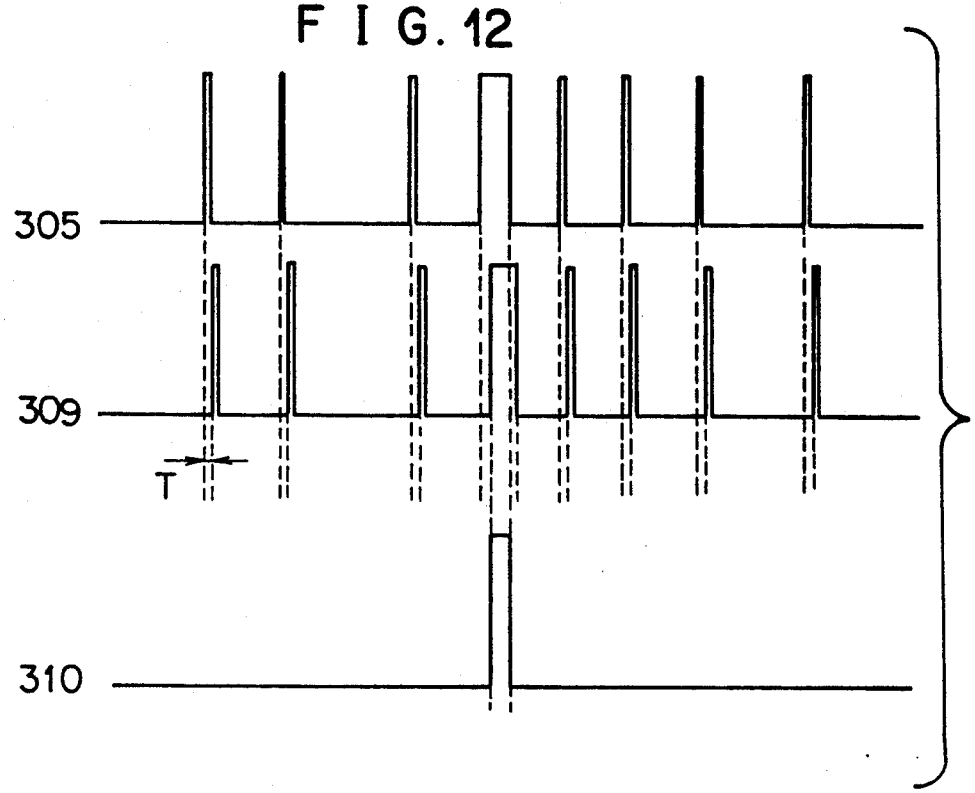
FIG. 12 illustrates details of the signals in the embodiment shown in FIG. 10.

FIG. 12 illustrates details of the signals in the embodiment shown in FIG. 10. A waveform 305 in FIG. 12, which is the same as the waveform 305 in FIG. 9, is delayed T seconds by the delay circuit 327, thereby resulting in a waveform 309. Normally, the delay time T is nearly equal to ½ of the reciprocal of the highest instantaneous frequency of the reproduced FM signal. The waveform 309 and the waveform 305 are ANDed by an AND circuit 328 to produce a waveform 310 in FIG. 12 which has a pulse width much wider than the delay time T. The described delay circuit 327 the AND circuit 328 for extracting pulses having widths wider than the time T seconds is only exemplary and may also be arranged using a one shot multi-vibrator or a flip flop. Optimum delay time of the delay circuit 318 in FIG. 10 is the sum of the propagation delay time of the EX-OR circuit 325 and the AND circuit 328 and T/2.

Fourth Embodiment

While the zero crossing points are recovered by addition and subtraction i.e., a linear operation in the first embodiment in FIG. 1 and the second embodiment shown in FIGS. 5 and 6, and by Boolean algebraic operation in the third embodiment shown in FIGS. 7 and 10, the zero crossing points may also be recovered by dynamically changing the threshold level L3 in the above described third embodiment, which will be described as follows.

Figure 13:
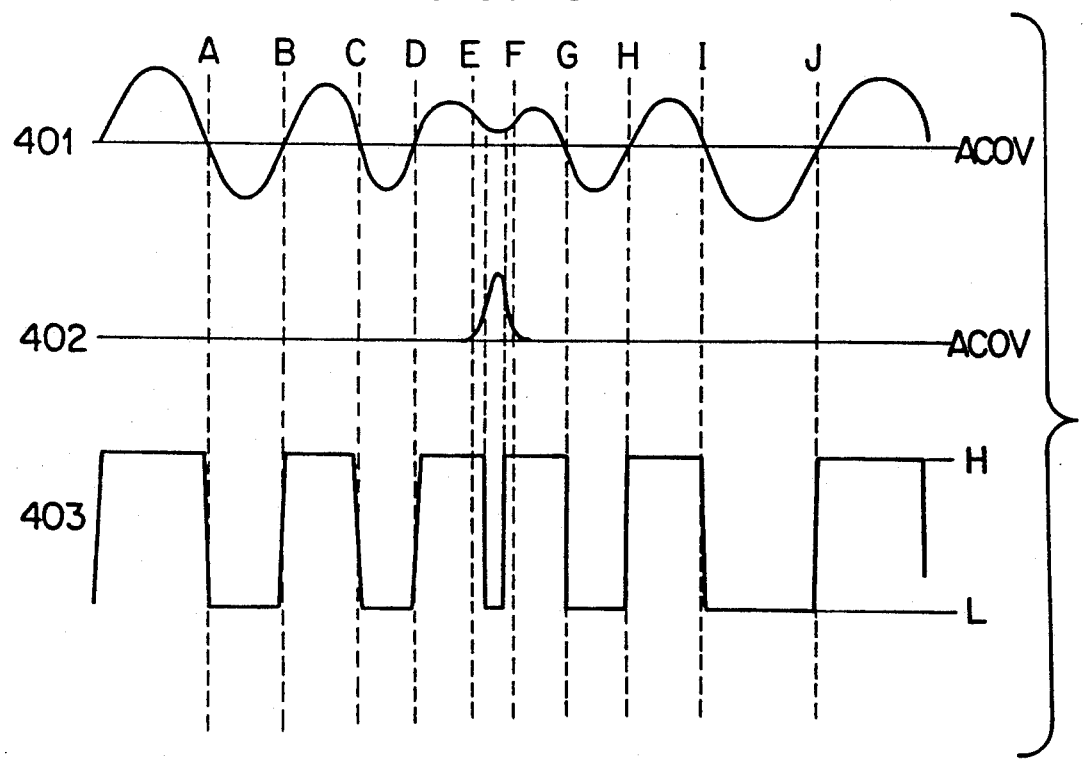
FIG. 13 illustrates waveforms at various points in FIG. 11.
Figure 17:
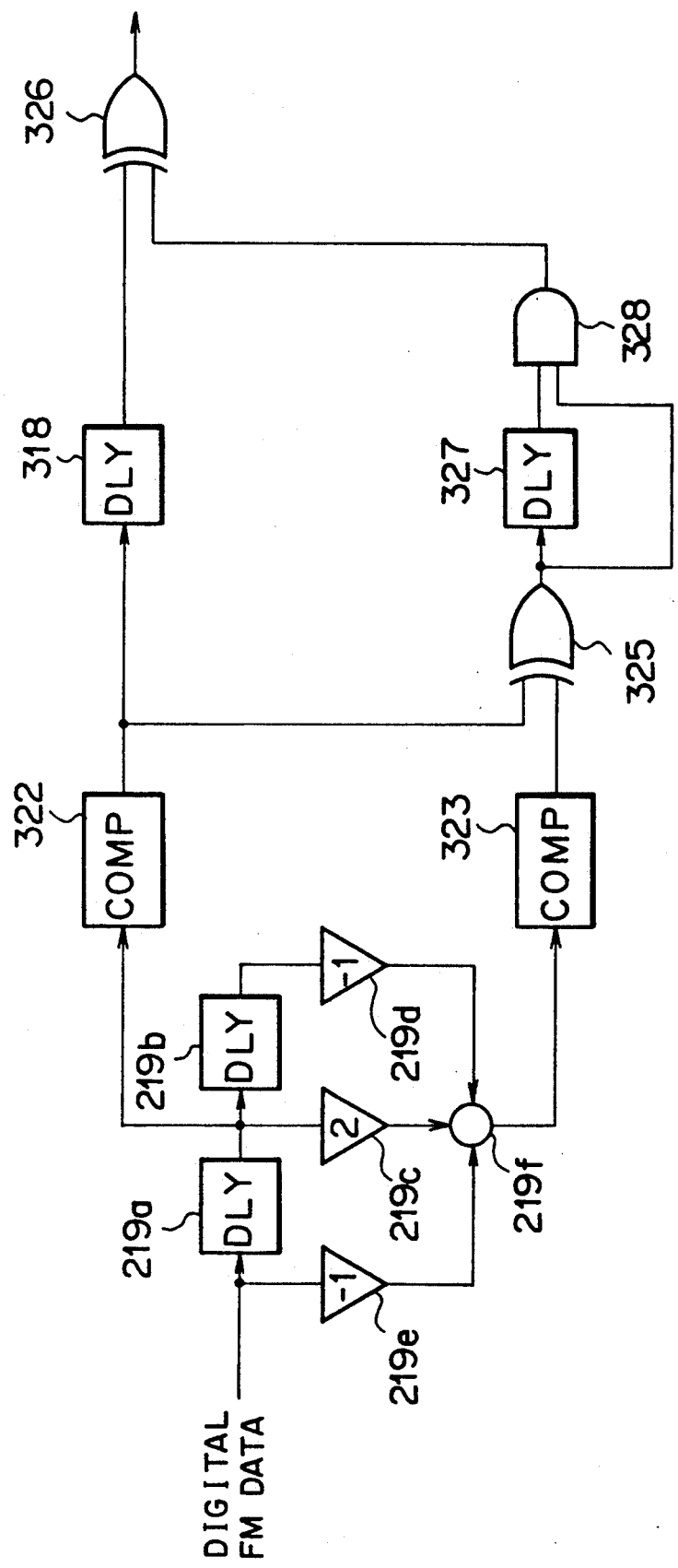
FIG. 17 shows a digital type inversion phenomenon preventing apparatus realized by combining the BPF of the sine-type filter in FIG. 6 with the pulse pick-up circuit formed of the comparator, the logic gates and the delay circuit.
Figure 18:
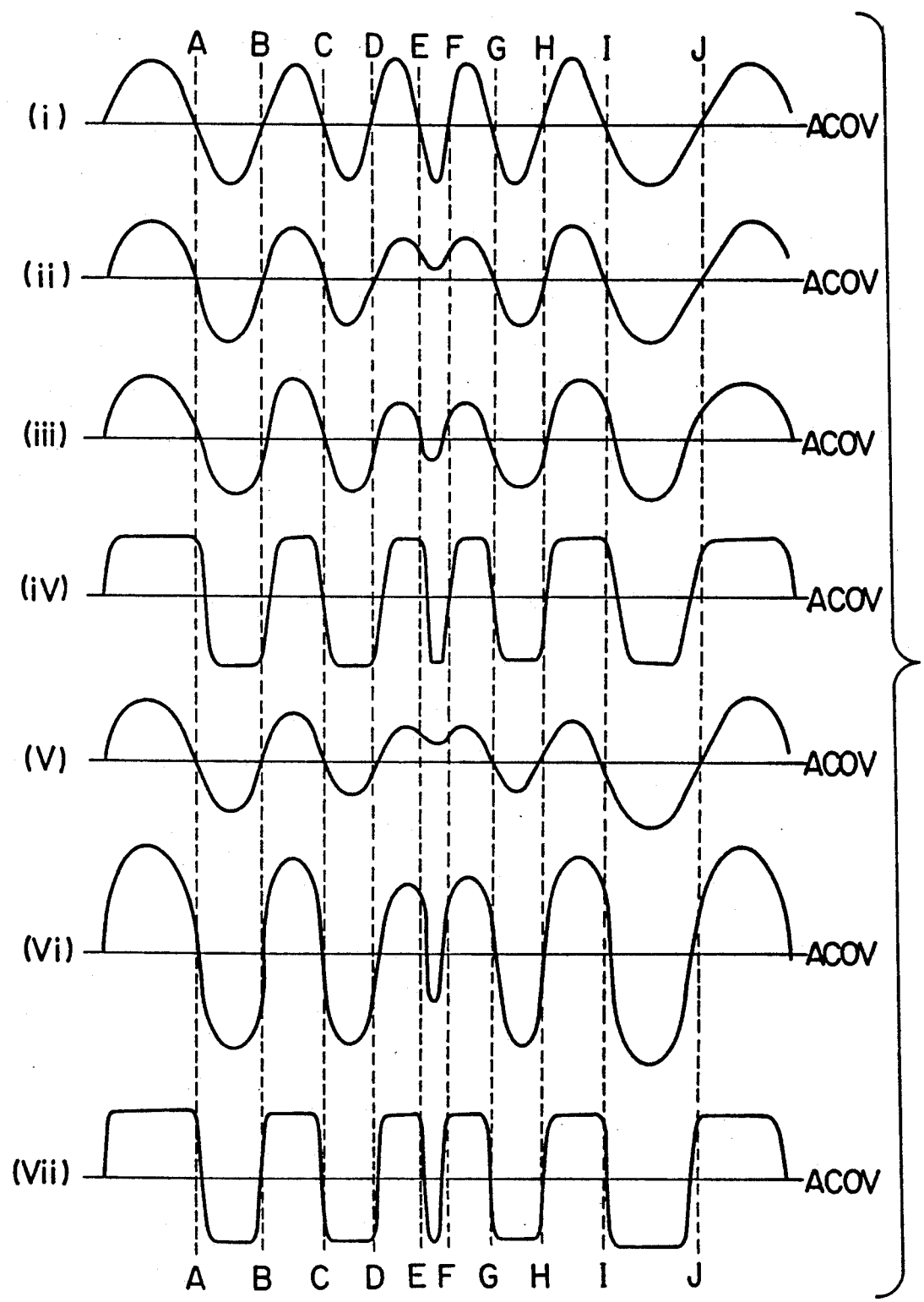
FIG. 18 is a waveform diagram for showing waveforms at various points of the block diagram in FIG. 16.

FIG. 11 shows a fourth embodiment of the invention, which is of the same arrangement as the second embodiment shown in FIG. 5 except for the adding circuit 219 and the limiter 210. Thus detailed description will be omitted. FIG. 13 illustrates waveforms at various points in FIG. 11. The output of the slicer 417 will be a waveform 402, the same as through the slicer 217 in FIG. 6 of the second embodiment, which is supplied as a threshold level to the comparator 420. The waveform 401, aligned in phase with the waveform 402 by the delay circuit 418 is also supplied to the comparator 420, thus producing a waveform 403. The comparator 420 outputs H level when the level of the waveform 401 is higher than the level of the waveform 402, and outputs L level when the level of the waveform 401 is lower than that of the waveform 402. Thus the waveform 403 is of a low level during a time interval between the zero crossing points E and F. In this manner, the zero crossing points at points E and F are recovered. Also, the comparator 420 may be readily constructed of, for example, a MIN circuit and a MAX circuit. Further, the first, second, and third embodiments may be combined. For example, a digital apparatus for preventing inversion phenomenon as shown in FIG. 17 can be realized by combining the BPF of the sine-type filter 219 in FIG. 6 with the pulse pickup circuit formed of the comparators 322, 323, the EX-OR circuits 325, AND circuit 328 and the delay circuit 327.

Fifth Embodiment

A fifth embodiment of the invention will now be described as follows.

Figure 20:
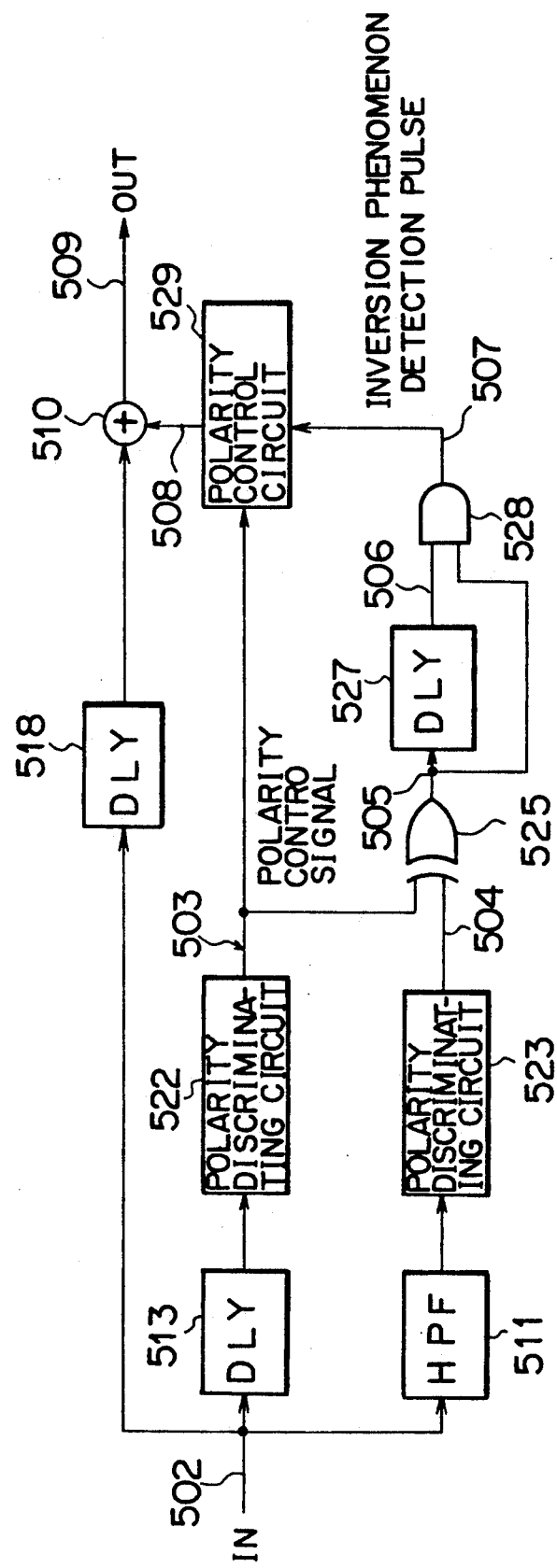
FIG. 20 shows a fifth embodiment of the invention.
Figure 27:
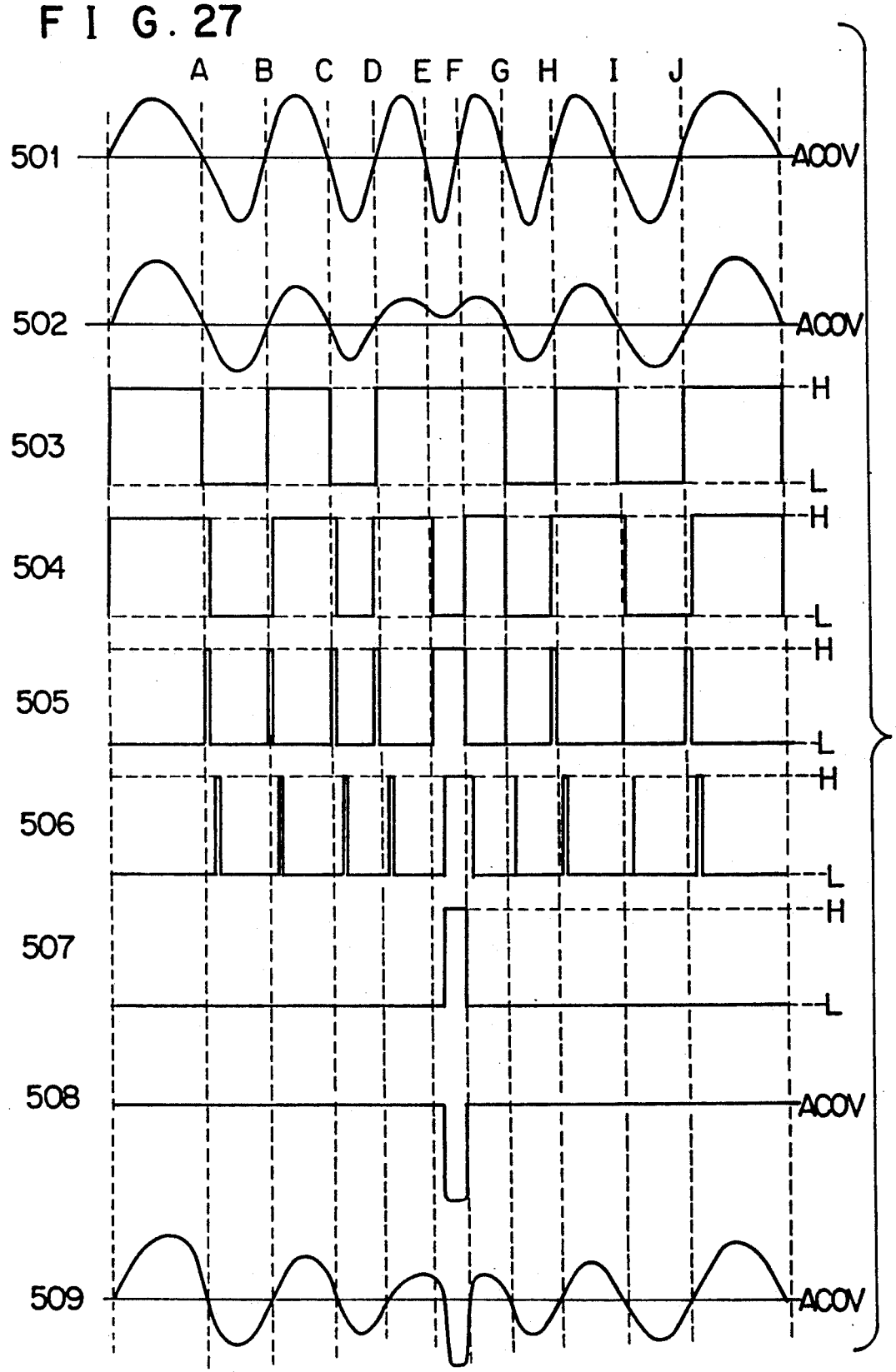
FIG. 27 illustrates waveforms at various points in FIG. 20.

FIG. 20 shows the fifth embodiment of an inversion phenomenon preventing apparatus and FIG. 27 illustrates waveforms at various points in FIG. 20. No zero crossing points are absent in the time axis of a normal FM signal 501 in FIG. 20 while the zero crossing points are absent at points E and F of a waveform 502 in FIG. 27. The waveform 502 represents an FM signal reproduced by means of the video signal storage/reproduction apparatus and is supplied to an input terminal IN of a block diagram in FIG. 20.

A delay circuit 513 has a delay time nearly equal to that of an HPF 511. When the output of the delay circuit 513 is fed to a first polarity discriminating circuit 522, amplitudes greater than a predetermined level, for example, O V, are converted into a high level and amplitudes smaller than O V are converted into a low level. Thus a waveform 503 as depicted in FIG. 27 is produced. In the mean time, the HPF 511 provides an output in which the zero crossing points are shifted in time from the waveform 502 but are not absent at all. A second polarity discriminating circuit 523 receives the output of the HPF 511 to provide a waveform 504 in FIG. 27. The waveforms 503 and 504 are supplied to an EX-OR circuit 525, which in turn provides an output waveform depicted by 505 in FIG. 27. It should be noted that the waveform 505 is at a high level both at portions where the zero crossing points are absent and at portions where the zero crossing points are shifted in time from the waveform 502. The missing zero crossing points may be recovered by extracting only pulses having pulse widths much wider than half the reciprocal of the highest instantaneous frequency of the waveform 502 and then adding these pulses, with their polarity being arranged properly, to the waveform 503. For this purpose, the waveform 505 is delayed by a delay circuit 527 to produce a waveform 506 which is delayed somewhat relative to the waveform 505. The waveform 505 and the waveform 506 are then supplied to an AND circuit 528 so as to produce a waveform as depicted by 507. Thus, a pulse appears only at a portion at which the zero crossing points are absent in the waveform 502. In order to combine the pulse 507 thus obtained with the waveform 502, the polarity of the pulse 507 must be carefully set. In the case where the waveform 502 is to be recovered as well as the missing zero crossing points thereof, a negative pulse must be added to the waveform 502 since the zero crossing points are absent at a high level amplitude of the waveform 503, while a positive pulse must be added if the zero crossing points are absent at a low level. The waveform 507 is supplied to a polarity control circuit 529 which reverses the polarity of an input thereto as shown by a waveform 508 in FIG. 27.

The waveform 508 and the waveform 502 are added by an adder 510 to produce a waveform 509 in FIG. 27 in which the zero crossing absent in the waveform 502 has now been recovered. The delay circuit 518 causes signal delay equal to the total amount of delay time of the signal path from the input IN to the output of the polarity control circuit 529.

Figure 21:
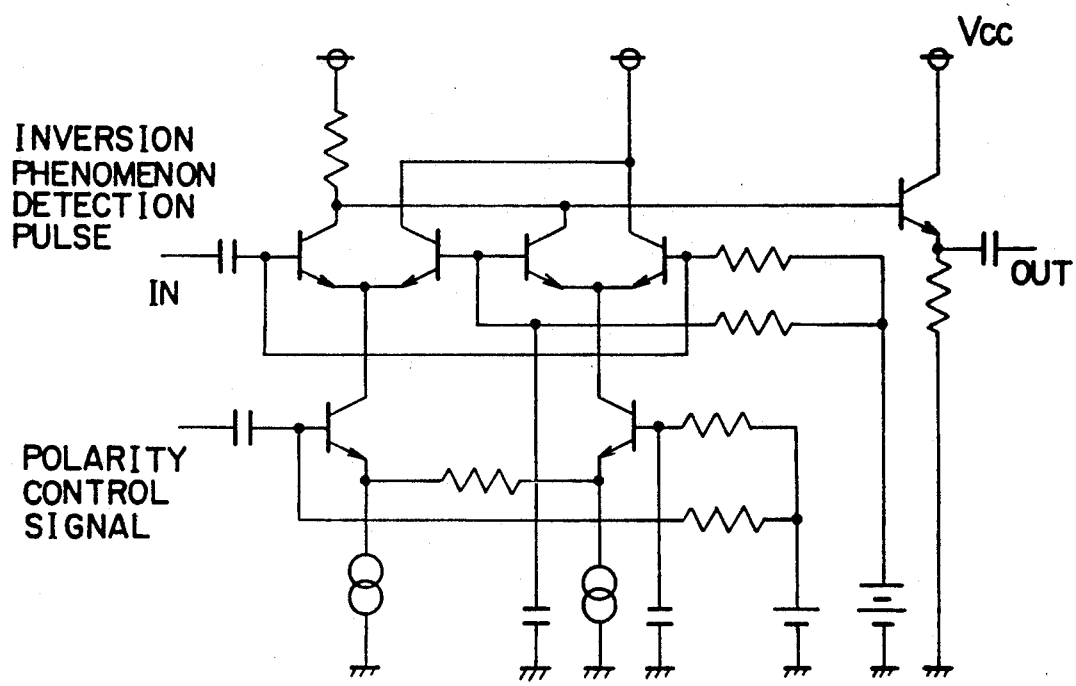
FIG. 21 shows a specific embodiment of the polarity control circuit.
Figure 22:
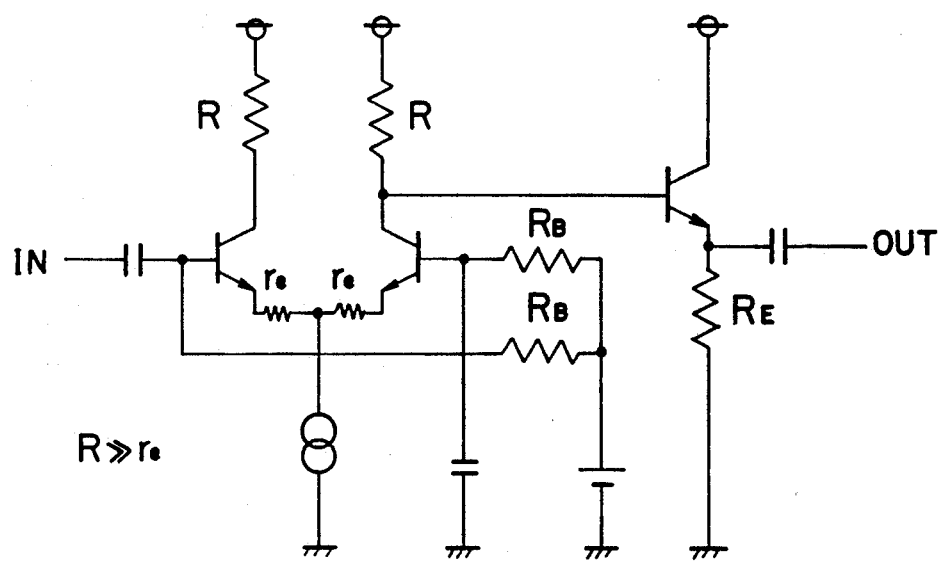

FIG. 21 shows a specific embodiment of the polarity control circuit 529. FIG. 22 and FIG. 23 show specific embodiments of the polarity discriminating circuits 522, 523. Other circuit arrangements may also be used as polarity discriminating circuits providing that they operate in the above mentioned manner. Pulses having widths in accordance with how seriously the zero crossing points are absent may be added to the waveform 502 to optimally recover the absent zero crossing points. This is more advantageous than simply adding pulses having a fixed width produced by, for example, a monostable multivibrator or through differentiation of a signal with a fixed time constant. FIG. 24 shows a block diagram of an inversion phenomenon preventing apparatus using a circuit, called an inversion phenomenon detection pulse adding circuit 13. Here, pulses having widths in accordance with how seriously the zero crossing points are absent in the reproduced FM signal are added to the portions of the FM signal where the zero crossing points are actually absent.

Figure 28:
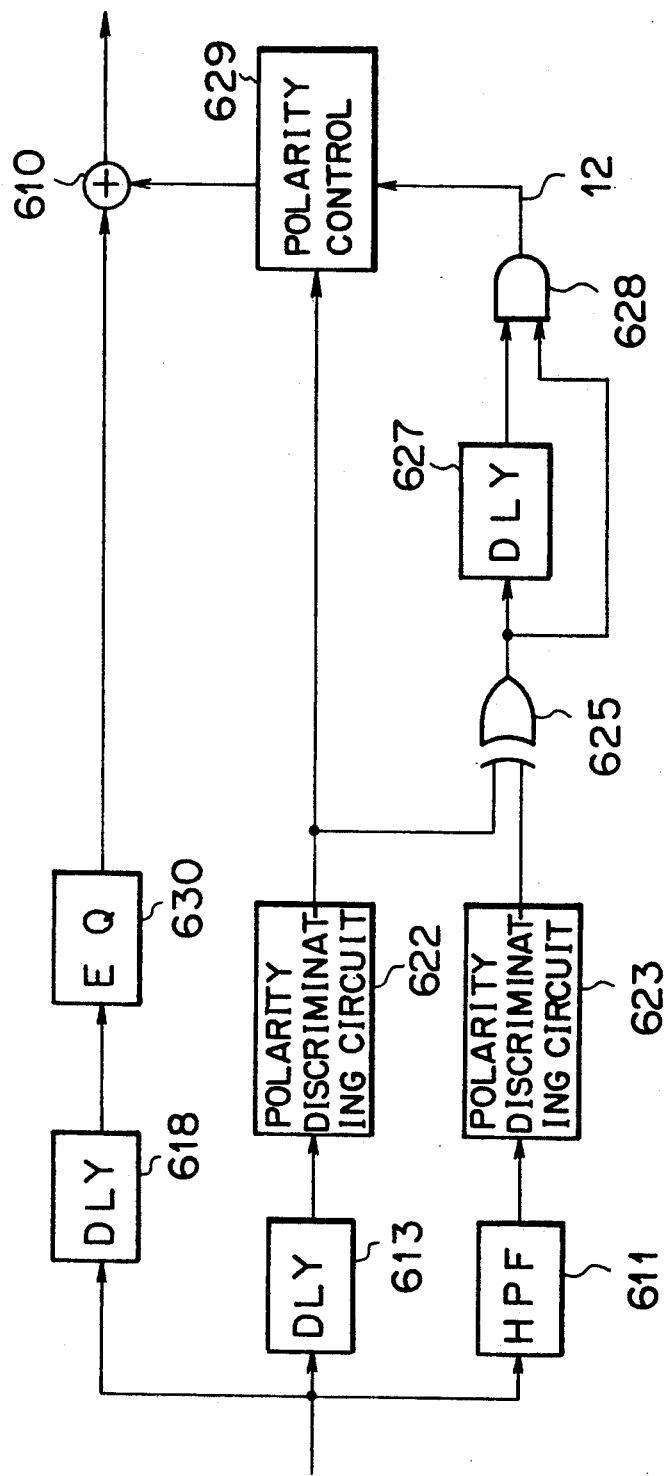
FIG. 28 shows an example of the fifth embodiment to which an equilizer has been added in FIG. 20.

FIG. 28 shows an example of the fifth embodiment to which an equalizer has been added in FIG. 20.

Sixth Embodiment

Figure 25:
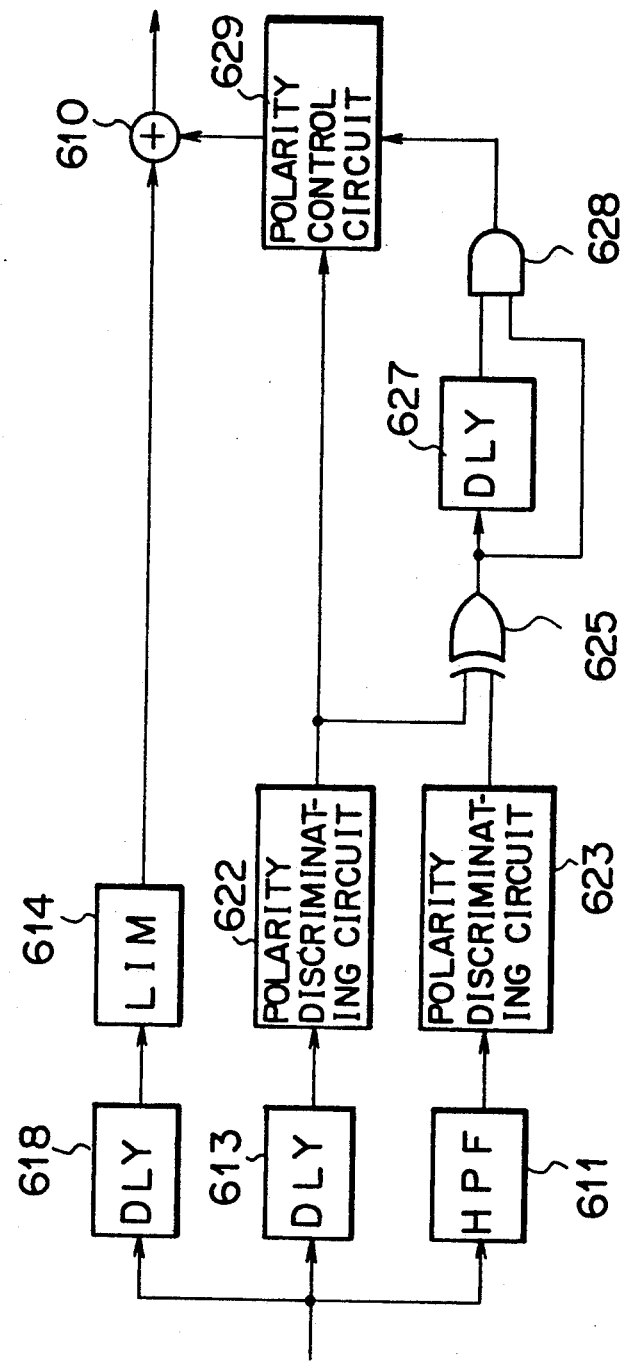
FIG. 25 shows a sixth embodiment of the invention.

A sixth embodiment of the invention will now be described with reference to FIG. 25 as follows.

The operation of the sixth embodiment is generally the same as that of the arrangement in FIG. 20 except that the waveform 502 is not added directly to a pulse representative of absence of the zero crossing points, but through a delay circuit 618 and an amplitude limiter 614. This arrangement can prevent a variation in the envelope of the FM signal 502 caused during transmission before the waveforms are added by the adder 610. In addition, a BPF may be used in place of the HPF 611. A BPF which has good phase linearity may be used if phase characteristic is a most important design consideration. FIG. 26b shows an arrangement of such a BPF, where scaling factor indicates the ratio of levels of input signals supplied to the adder and may be set to $\frac{1}{4}$, $\frac{1}{2}$ and $-\frac{1}{4}$, respectively, for unity gain of the BPF. The circuit portions in FIGS. 20, 24, and 25, that correspond to a circuit in FIG. 26a, may be replaced by the circuit in FIG. 26b to obtain a filter having linear phase characteristics. Only a single filter is needed to form a circuit equivalent to that shown in FIG. 26b if the delay circuits in FIG. 26b are replaced by a reflection type.

Figure 30A:
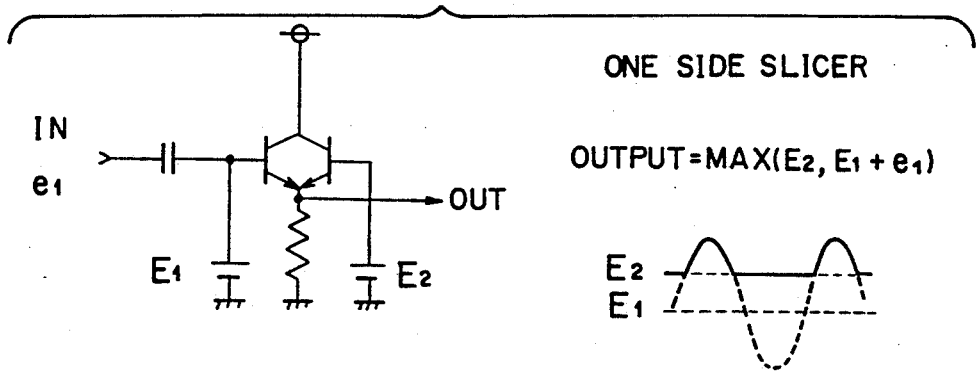
FIGS. 30a (1)-(2) and 30b (1)-(3) show circuit examples of a slicer.
Figure 30B:
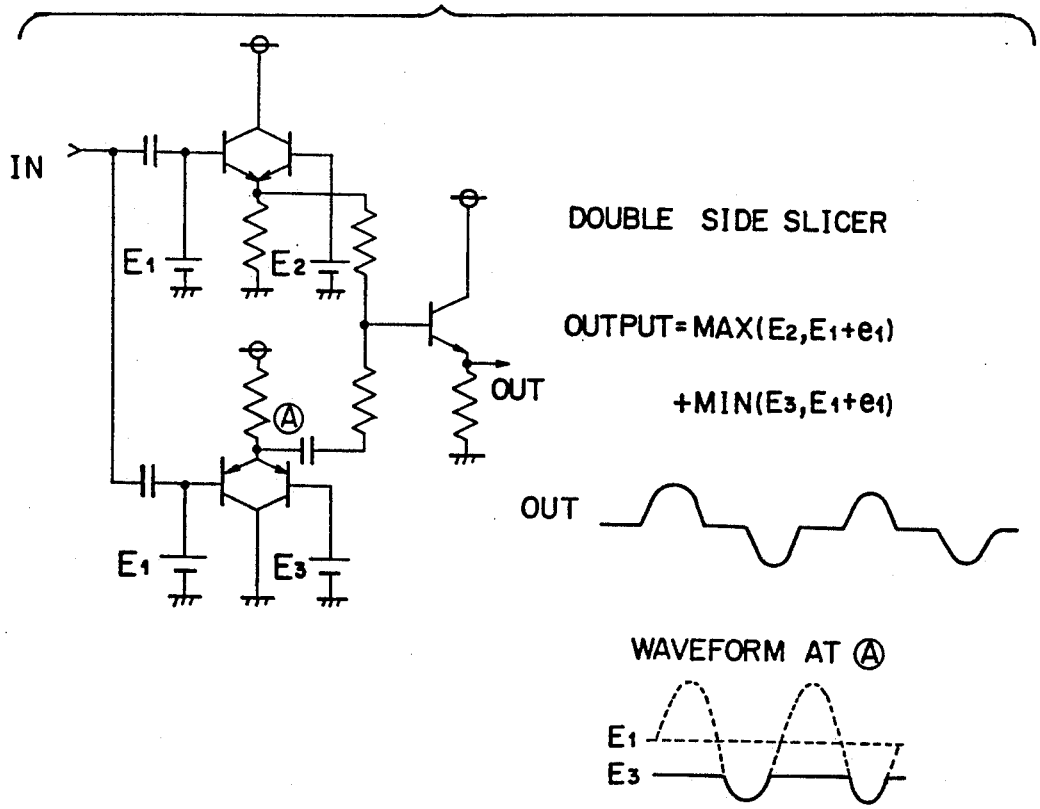

While a combination of a delay circuit and an AND circuit has been used to obtain pulses having pulse widths in accordance with degree of absence of the zero crossing points, an LPF and a slicer may be combined so that pulses are converted into signals amplitude of which are proportional to the width thereof and then eliminates amplitudes below a predetermined threshold value by the slicer. FIG. 30a(1) shows a circuit example of a one side slicer. The output shown in FIG. 30a(2) = Max($E_2$, $E_1 + e_1$). The resultant output waveform is shown by a solid line. FIG. 30b(1) shows a circuit example of a double sided slicer. The output shown in FIG. 30b(2) = Max($E_2$, $E_1 + e_1$) + Min($E_3$, $E_1 + e_1$). The resultant output waveform at point (A) is shown by a solid line in FIG. 30b(3).

Figure 31:
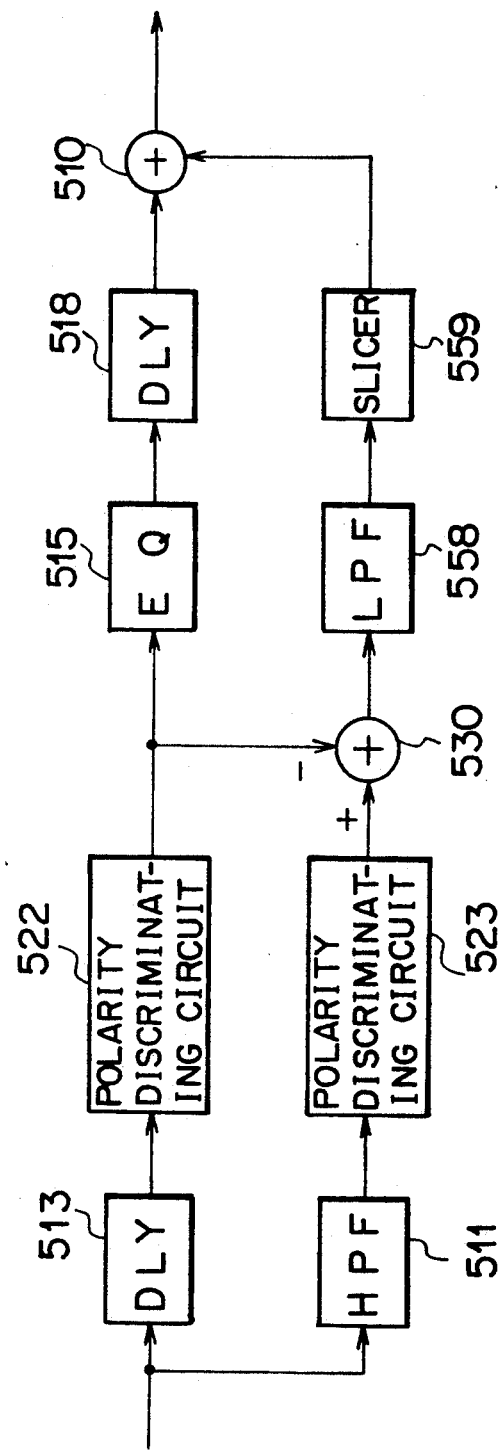

While the EX-OR circuit has been used as a means for comparing the outputs from the two polarity discriminating circuits 522 and 523, other circuit arrangement, for example, a subtracter, may be used for the same result as shown in FIG. 31, in which case the polarity control circuit 529 is not needed. Subtraction is performed by the single subtracter 530 in such a way that the output of the subtractor 530 will be of negative polarity when the output of the polarity discriminating circuit 522 is of H level and the output of the polarity discriminating circuit 523 is of L level while the pulse will be of positive polarity when the output is of L and H levels, respectively.

While combination of the LPF and the slicer simplifies circuit construction for extracting pulses in accordance with absence of the zero crossing points if the subtracter is used for comparing the outputs from the two polarity discriminating circuits 522, 523, the delay circuit 527 and the logic circuits may also be used to form the circuit.

Figure 29A:
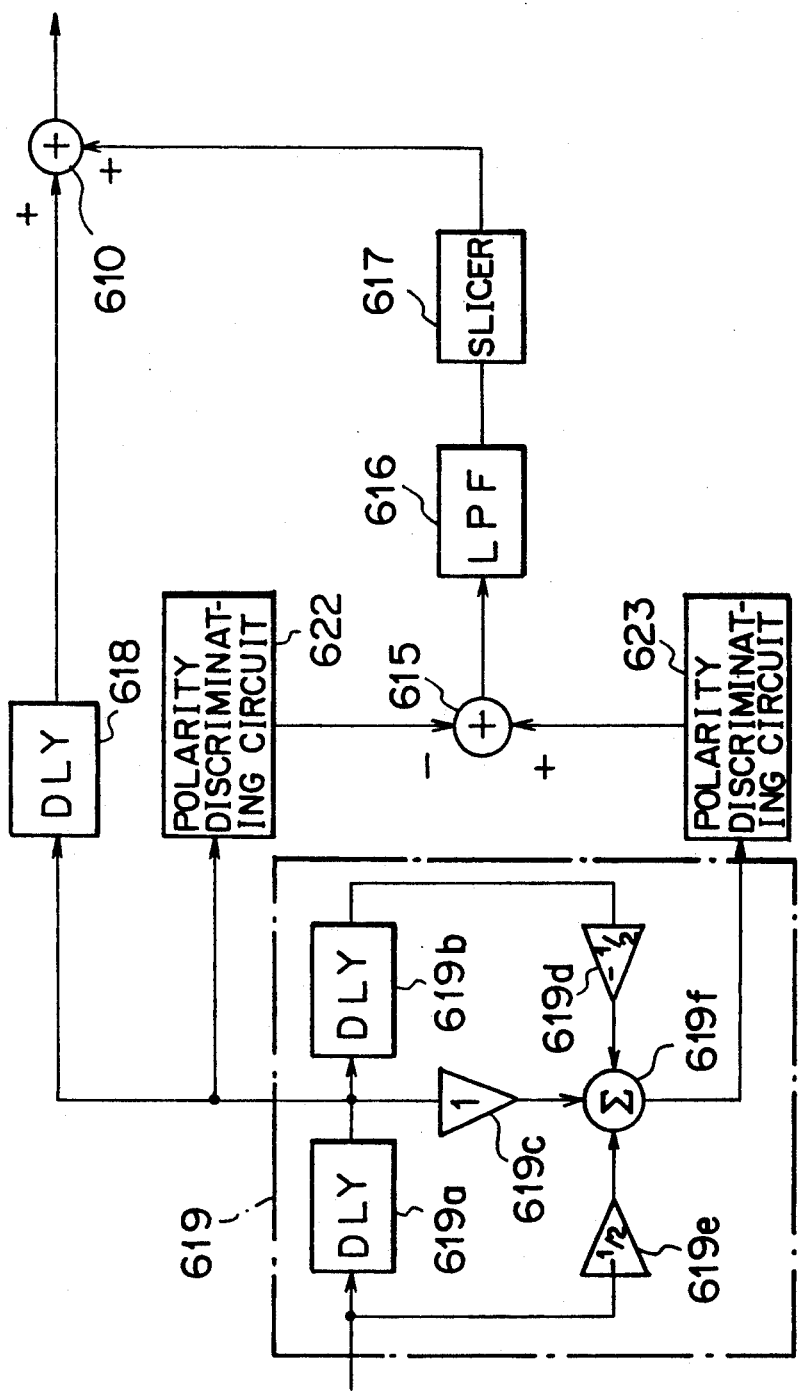
FIG. 29a shows an example of combining various embodiments.
Figure 29B:
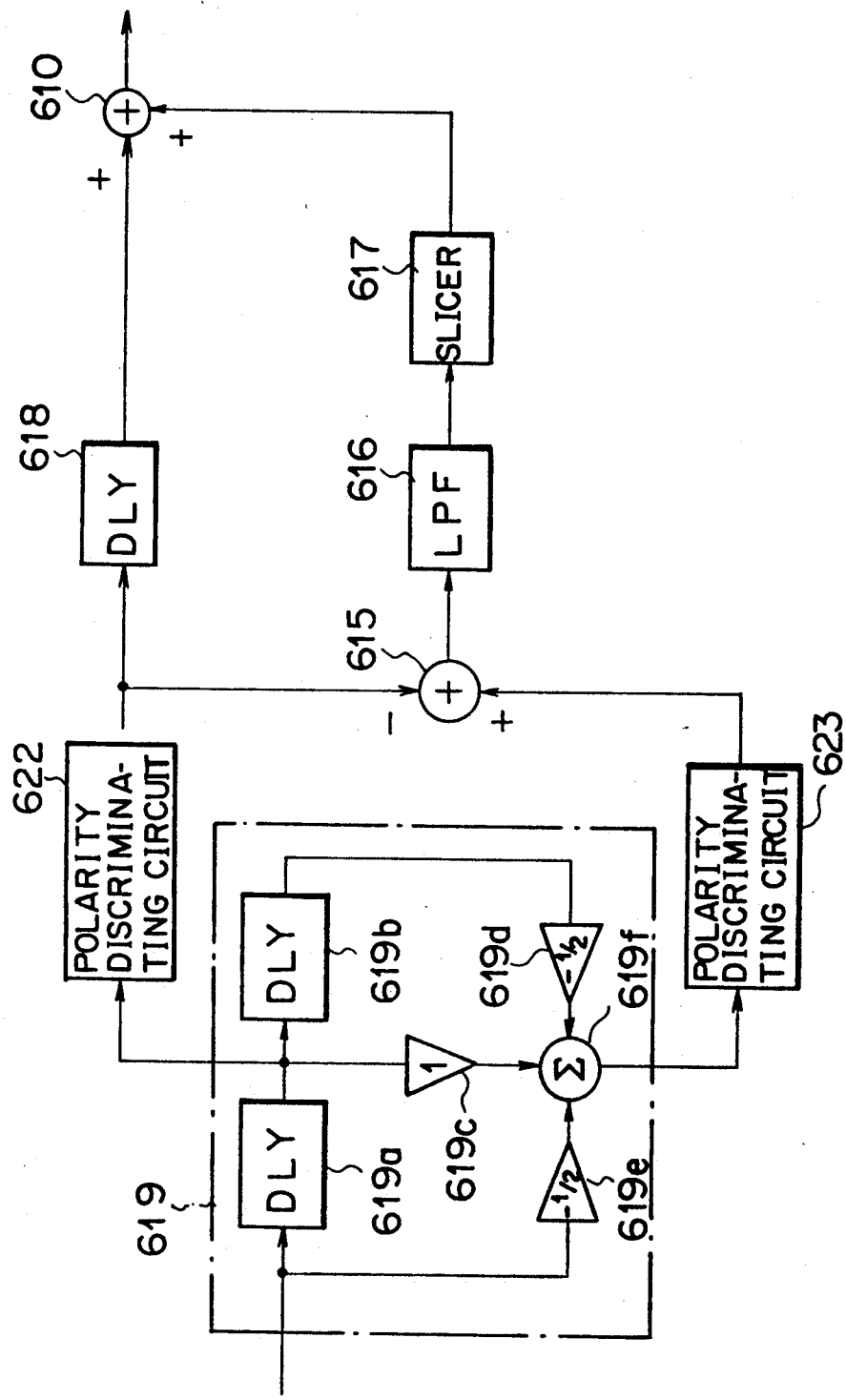
FIG. 29b shows an arrangement when the polarity decision circuits are constructed as shown in FIGS. 22 and 23.

Also the arrangement thus far described may be combined in any way, for example, an arrangement in FIG. 29a. An arrangement in FIG. 29b, where the exclusive OR circuit 525 has been replaced by subtractor 615 and the polarity control circuit 529 has been eliminated, may be used if the polarity discriminating circuits are constructed as shown in FIGS. 22 and 23. This is because the output of the polarity discriminating circuit 522 has the same information as the input FM signal in terms of the zero crossing points. FIG. 31 and FIG. 32 show such embodiments. The delay circuit used in FIG. 26b can of course be replaced by an LPF having a sufficient band width through which signals in the FM band can pass.

What is claimed is:

1. An apparatus for preventing inversion phenomenon resulting from drop out of at least one zero crossing point, comprising:
    an input terminal for receiving a recovered frequency modulated signal having at least one missing zero crossing point pair;
    lower side band attenuator connected to said terminal and producing an output of the recovered frequency modulated signal with an attenuated lower side band;
    first polarity discriminating means, connected to the output of said lower side band attenuator, for outputting a signal indicative of each of positive and negative amplitudes of the output of said lower side band attenuator;
    second polarity discriminating means connected to said input terminal, said second polarity discriminating means outputting a signal indicative of each of said positive and negative amplitudes of said frequency modulated signal;

pulse extracting means for taking a difference between the output from said first polarity discriminating means and the output of said second polarity discriminating means to produce a difference signal, and for extracting a single discrete signal component of said difference signal, having width greater than a predetermined value, from said difference signal only for each missing zero crossing point pair to produce only a single pulse having pulse width corresponding to said single discrete signal component for each missing zero crossing point pair;

waveform reforming means, responsive to each said single pulse developed by said pulse extraction means and to said recovered frequency modulated signal, for adding only said single pulses to said recovered frequency modulated signal to recover said zero crossing points missing from said frequency modulated signal.

2. An inversion phenomenon preventing apparatus according to claim 1, further comprising signal processing means for processing said recovered frequency modulated signal prior to providing it to said waveform reforming means, said processing being selected from one or more of amplitude limiting, equalizing, and signal delaying.

3. An inversion phenomenon preventing apparatus according to claim 1, wherein said pulse extracting means includes integration means for integrating said pulses to produce signals having amplitudes substantially proportional to pulse widths of said pulses;

said waveform reforming means including a comparator having a threshold level which varies in accordance with said signal produced by intergration means.

4. An inversion phenomenon preventing apparatus according to claim 1, wherein said waveform reforming means includes a limiter for amplitude limiting the output thereof.

5. An inversion phenomenon preventing apparatus according to claim 1, wherein said lower side band attenuator is a high pass filter.

6. An inversion phenomenon preventing apparatus according to claim 1, wherein said lower side band attenuator is a sine filter.

7. An inversion phenomenon preventing apparatus according to claim 1, wherein said lower side band attenuator is a band pass filter.

8. An inversion phenomenon preventing apparatus according to claim 1, wherein said first and second polarity discriminating means include comparators.

9. An inversion phenomenon preventing apparatus according to claim 1, wherein said first and second polarity discriminating means include amplitude limiters.

10. An inversion phenomenon preventing apparatus according to claim 1, wherein said waveform reforming means is a two-input exclusive OR circuit.

11. An inversion phenomenon preventing apparatus according to claim 10, wherein said pulse extracting means comprises a two-input exclusive OR circuit, a low pass filter connected to the output of said two-input exclusive OR circuit, and a comparator connected to the output of said low pass filter.

12. An inversion phenomenon preventing apparatus according to claim 1, wherein said pulse extracting means comprises a two-input exclusive OR circuit, a delay circuit connected to the output of said two-input exclusive OR circuit having, and a two-input AND circuit one input of thereof connected to the output of said delay circuit and the other input thereof connected to the input of said delay circuit.

13. An inversion phenomenon preventing apparatus according to claim 1, wherein said apparatus further comprises:

polarity control means, connected to the output of said pulse extracting means, for converting said pulses produced by from said pulse extracting means into second pulses having polarity depending on the polarity of the output of said second polarity discriminating means and said pulses, said polarity control means outputting said second pulses to said waveform reforming means; wherein said waveform reforming means reconstructs said zero crossing points partly absent in said FM signal from said frequency modulated signal and the output of said polarity control means.

14. An inversion phenomenon preventing apparatus according to claim 13, wherein said apparatus further comprises a delay circuit;

said frequency modulated signal being supplied to said waveform reforming means from said input terminal through said delay circuit.

15. An inversion phenomenon preventing apparatus according to claim 13, wherein said apparatus further comprises a delay circuit connected to said input terminal and a limiter connected to the output of said delay circuit;

said frequency modulated signal being supplied to said waveform reforming means from said input terminal through said delay circuit and said limiter.

16. An inversion phenomenon preventing apparatus according to claim 13, wherein said apparatus further comprises a delay circuit connected to said input terminal, and an equalizer connected to the output of said delay circuit; said frequency modulated signal being supplied to said waveform reforming means from said input terminal through said delay circuit and said equalizer.

17. An inversion phenomenon preventing apparatus according to claim 1, wherein said waveform reforming means includes an adder.

18. An inversion phenomenon preventing apparatus according to claim 17, wherein said pulse extracting means comprises a subtracter, a low pass filter connected to the output of said subtracter, and a slicer connected to the output of said low pass filter.

19. An inversion phenomenon preventing apparatus according to claim 18, wherein said apparatus further comprises a delay circuit;

said frequency modulated signal being supplied to said waveform reforming means from said input terminal through said delay circuit.

20. An inversion phenomenon preventing apparatus according to claim 18, wherein said apparatus further comprises an equalizer connected to said input terminal, a delay circuit connected to the output of said equalizer, and a limiter connected to the output of said delay circuit; said frequency modulated signal being supplied to said waveform reforming means from said input terminal through said equalizer, said delay circuit, and said limiter.

21. An inversion phenomenon preventing apparatus according to claim 18 wherein said apparatus further comprises an equalizer and a delay circuit connected to the output of said equalizer, said frequency modulated signal being supplied to said waveform reforming means from said input terminal through said delay circuit.

22. An inversion phenomenon preventing apparatus according to claim 1, wherein said recovered frequency modulated signal is missing said at least one missing zero crossing point pair when output from a tape.

23. An inversion phenomenon preventing apparatus according to claim 1, wherein said recovered frequency modulated signal is missing said at least one missing zero crossing point pair when output from a frequency equalizer.

24. A system for preventing an inversion phenomenon in a recovered frequency modulated signal, resulting from drop out of at least one zero crossing point, wherein one or more pairs of zero crossing points are missing, comprising:
 means for identifying only the pairs of missing zero crossing points of the recovered frequency modulated signal and producing a missing zero crossing point identifying signal describing only missing zero crossing point pairs;
 means, responsive to the missing zero crossing point identifying signal, for producing only a single individual pulse associated with each identified missing zero crossing point pair; and
 means for combining each said individual pulse, developed by said means for producing only a single individual pulse, with the recovered frequency modulated signal to inhibit the inversion phenomena.

25. The system of claim 24 wherein said means for combining combines only individual pulses associated with missing zero crossing point pairs with said recovered frequency modulated signal.

26. The system of claim 24 wherein said means for identifying performs additions and subtractions to produce the missing zero crossing point identifying signal.

27. The system of claim 24 wherein said means for identifying performs boolean algebraic operations to produce the missing zero crossing point identifying signal.

28. The system of claim 24 wherein said means for identifying includes a filter removing low frequencies from said recovered frequency modulated signal to recreate missing zero crossing points.

29. The system of claim 28 wherein said filter is a high pass filter exhibiting good phase linearity.

30. The system of claim 28 wherein said filter is a band pass filter.

31. The system of claim 28 wherein said filter is a sine filter.

32. The system of claim 28 wherein said means for identifying further includes difference means, responsive to the filtered recovered frequency modulated signal, for taking a difference between the filtered frequency modulated signal and said recovered frequency modulated signal to extract a missing zero crossing point identifying signal containing the missing zero crossing points.

33. The system of claim 32 wherein said means for taking a difference includes an adder or subtractor.

34. The system of claim 32 wherein said means for taking a difference includes an exclusive OR gate.

35. The system of claim 32 wherein said means for producing at least one individual pulse includes,
 a low pass filter receiving and filtering said missing zero crossing point identifying signal, and
 a slicer slicing a portion of said filtered missing zero crossing point identifying signal around each missing zero crossing point pair to form at least one phase corrected compensation pulse.

36. The system of claim 35 wherein said low pass filter attenuates phase shift causing high frequency components from said recovered frequency modulated portion.

37. The system of claim 35 wherein said low pass filter reduces the amplitude of differences between the filtered frequency modulated signal and said recovered frequency modulated signal not associated with missing zero crossing points.

38. The system of claim 32 wherein said means for producing only a single individual pulse includes,
 a delay receiving and delaying said missing zero crossing point identifying signal, and
 an AND gate receiving said missing zero crossing point identifying signal and said delayed missing zero crossing point identifying signal received from said delay;
 said difference means defining only missing zero crossing points in said missing zero crossing point identifying signal, to remove phase shift producing short duration pulses, unrelated to missing zero crossing points, therefrom.

39. The system of claim 32 wherein said means for producing only a single individual pulse includes,
 a low pass filter receiving and filtering said missing zero crossing point identifying signal, and
 a comparator comparing said filtered missing zero crossing point identifying signal with a threshold, to remove phase shift producing short duration pulses unrelated to missing zero crossing points therefrom, to form at least one phase corrected compensation pulse.

40. The system of claim 32 wherein said means for identifying further includes compensation means for compensating for the phase shift caused by said high pass filter.

41. The system of claim 40 wherein said means for compensating includes a phase equalizer.

42. The system of claim 40 wherein said means for compensating includes a first delay for delaying said recovered frequency modulated signal.

43. The system of claim 32 wherein said means for identifying further includes,
 a first limiter for limiting the recovered frequency modulated signal to produce a limited recovered frequency modulated signal, and
 a second limiter for limiting the filtered recovered frequency modulated signal to produce a filtered and limited recovered frequency modulated signal.

44. The system of claim 32 wherein said means for identifying further includes,
 a first comparator for comparing the recovered frequency modulated signal with a predetermined threshold to produce a limited recovered frequency modulated signal, and
 a second comparator comparing the filtered recovered frequency modulated signal to a predetermined threshold to produce a filtered and limited recovered frequency modulated signal.

45. The system of claim 24 wherein said means for combining includes an adder for adding said individual pulses produced by said means for producing to said recovered frequency modulated signal to produce a missing zero crossing point corrected frequency modulated signal.

46. The system of claim 24 wherein said means for combining includes an exclusive OR gate for combining said individual pulses produced by said means for producing with said recovered frequency modulated signal to produce a missing zero crossing point corrected frequency modulated signal.

47. The system of claim 24 wherein said means for combining includes a comparator receiving said recovered frequency modulated signal, said comparator comparing said recovered frequency modulated signal with said at least one individual pulse to produce a missing zero crossing point corrected frequency modulated signal.

48. The system of claim 44 wherein said first and second comparators are polarity discrimination circuits and said predetermined thresholds are zero volts.

49. The system of claim 48 further comprising polarity control circuit, responsive to said first comparator, for selectively inverting said individual pulses to make their polarity subtractive from said recovered frequency modulated signal to thereby add missing zero crossing points to produce a missing zero crossing point corrected frequency modulated signal.

50. The system of claim 24, wherein said recovered frequency modulated signal is missing said one or more pairs of zero crossing points when output from a tape.

51. The system of claim 24, wherein said recovered frequency modulated signal is missing said one or more pairs of zero crossing points when output from a frequency equalizer.

52. A method of preventing an inversion phenomenon in a recovered frequency modulated signal, resulting from a drop out of at least one zero crossing point, wherein at least one pair of zero crossing points are missing, comprising the steps of:
(a) identifying only pairs of missing zero crossing points of the recovered frequency modulated signal;
(b) producing only a single individual pulse for each missing zero crossing point pair identified in said step (a); and
(c) combining said single pulses developed by said step (b) with the recovered frequency modulated signal to inhibit the inversion phenomena.

53. The method of claim 52 wherein only individual pulses associated with missing zero crossing points are combined with the recovered frequency modulated signal.

54. The method of claim 52 wherein said step (a) performs additions and subtractions to produce a missing zero crossing point signal.

55. The method of claim 52 wherein said step (a) performs boolean algebraic operations to produce a missing zero crossing point signal.

56. The method of claim 52 wherein said step (a) includes the step of (i) suppressing the lower side band of the recovered frequency modulated signal to produce a filtered frequency modulated signal to recover all zero crossing points.

57. The method of claim 52 wherein said at least one pulse produced by said step (b) simulates the originally generated frequency modulated signal in the area about the missing zero crossing point locations.

58. The method of claim 56 wherein said step (a) further includes the step of (ii) taking a difference between the filtered frequency modulated signal and the recovered frequency modulated signal to extract a missing zero crossing point identifying signal associated with each missing zero crossing point pair.

59. The method of claim 58 wherein said step (ii) is performed by adding or subtracting.

60. The method of claim 58 wherein said step of taking a difference is performed by performing a Boolean exclusive OR operation.

61. The method of claim 58 wherein said step (b) includes the steps of,
(i) filtering the missing zero crossing point identifying signal, and
(ii) slicing a portion of the filtered missing zero crossing point identifying signal around each missing zero crossing point pair to form at least one phase corrected compensation pulse.

62. The method of claim 61 wherein said step (i) attenuates phase shift cuasing high frequency components from the recovered frequency modulated portion.

63. The method of claim 61 wherein said step (i) reduces the amplitude of differences between the filtered frequency modulated signal and the recovered frequency modulated signal not associated with missing zero crossing points.

64. The method of claim 58 wherein said step (b) includes the steps of,
(i) delaying the missing zero crossing point signal, and
(ii) logically ANDing the missing zero crossing point signal and the delayed missing zero crossing point signal of said step (i);
said step (b) isolating pulses defining missing zero crossing points in the missing zero crossing point identifying signal to remove phase shift producing short duration pulses, unrelated to missing zero crossing points, therefrom.

65. The method of claim 58 wherein said step (b) includes the steps of,
(i) filtering the missing zero crossing point identifying signal, and
(ii) comparing the filtered missing zero crossing point identifying signal with a threshold to remove phase shift producing short duration pulses, unrelated to missing zero crossing points, therefrom, to form at least one phase corrected compensation pulse.

66. The method of claim 58 wherein said step (a) further includes the step of (iii) compensating for the phase shift caused by said step (i).

67. The method of claim 58 wherein said step (a) further includes the steps of,
iv) limiting the recovered frequency modulated signal to produce a limited recovered frequency modulated signal, and
v) limiting the filtered recovered frequency modulated signal to produce a filtered and limited recovered frequency modulated signal.

68. The method of claim 58 wherein said step (a) further includes the steps of,
iv) comparing the recovered frequency modulated signal with a predetermined threshold to produce a limited recovered frequency modulated signal, and
v) comparing the filtered recovered frequency modulated signal to a predetermined threshold to produce a filtered and limited recovered frequency modulated signal.

69. The method of claim 52 wherein said step (c) includes the step of (i) adding the individual pulses produced by said step (b) of producing to said recovered frequency modulated signal to produce a missing zero crossing point corrected frequency modulated signal.

70. The method of claim 52 wherein said step (c) includes the step of (i) performing a logical exclusive OR operation to combine the individual pulses produced by said step (b) with the recovered frequency modulated signal to produce a missing zero crossing point corrected frequency modulated signal.

71. The method of claim 52 wherein said step (c) includes the step of (i) comparing the recovered frequency modulated signal with at least one individual pulse to produce a missing zero crossing point corrected frequency modulated signal.

72. The method of claim 68 wherein said steps (iv) and (v) perform polarity discrimination using predetermined thresholds of zero volts.

73. The method of claim 72 further comprising the step of (d) selectively inverting the individual pulses to make their polarity subtractive from the recovered frequency modulated signal to thereby add missing zero crossing points to produce a missing zero crossing point corrected frequency modulated signal.

74. The method of claim 52, wherein said recovered frequency modulated signal is missing said at least one pair of zero crossing points when output from a tape.

75. The method of claim 52, wherein said recovered frequency modulated signal is missing said at least one pair of zero crossing points when output from a frequency equalizer.

76. A system for preventing an inversion phenomena in a recovered frequency modulated signal, resulting from a drop out of at least one zero crossing point, wherein at least one pair of zero crossing points are missing, comprising:
 a filter suppressing the lower side band of the recovered frequency modulated signal to identify all zero crossing points and producing a filtered recovered frequency modulated signal;
 means, responsive to the filtered recovered frequency modulated signal, for producing a missing zero crossing point signal containing the missing zero crossing points;
 deletion means, responsive to said missing zero crossing point signal, for eliminating all portions of said recovered frequency modulated signal not associated with missing zero crossing points to produce a compensation pulse representing only missing zero crossing point pairs; and
 means for combining said compensation pulse with said recovered frequency modulated signal to inhibit the inversion phenomena.

77. The system of claim 76 wherein said means for combining combines only individual compensation pulses associated with missing zero crossing point pairs with said recovered frequency modulated signal.

78. The system of claim 76 wherein said deletion means includes,
 a delay receiving and delaying said missing zero crossing point signal, and
 an AND gate receiving said missing zero crossing point signal and said delayed missing zero crossing point signal received from said delay;
 said means for eliminating isolating pulses defining missing zero crossing points in said missing zero crossing point identifying signal to remove phase shift producing short duration pulses, unrelated to missing zero crossing points, therefrom.

79. The system of claim 76 wherein said means for eliminating includes,
 a low pass filter receiving and filtering said missing zero crossing point identifying signal, and
 a slicer slicing a portion of said filtered missing zero crossing point identifying signal around each missing zero crossing point pair to form at least one phase corrected compensation pulse.

80. The system of claim 76 wherein said means for eliminating includes,
 a low pass filter receiving and filtering said missing zero crossing point identifying signal, and
 a comparator comparing said filtered missing zero crossing point identifying signal with a threshold to remove phase shift produced short duration pulses unrelated to missing zero crossing points therefrom to form at least one phase corrected compensation pulse.

81. The system of claim 76 wherein said means for combining includes an adder for adding said individual compensation pulses produced by said means for producing to said recovered frequency modulated signal to produce a missing zero crossing point corrected frequency modulated signal.

82. The system of claim 76 wherein said means for combining includes an exclusive OR gate for combining said individual compensation pulses produced by said means for producing with said recovered frequency modulated signal to produce a missing zero crossing point corrected frequency modulated signal.

83. The system of claim 76 wherein said means for combining includes a comparator receiving said recovered frequency modulated signal, said comparator comparing said recovered frequency modulated signal with said at least one individual compensation pulse to produce a missing zero crossing point corrected frequency modulated signal.

84. The system of claim 76, wherein said recovered frequency modulated signal is missing said at least one pair of zero crossing points when output from a tape.

85. The system of claim 76, wherein said recovered frequency modulated signal is missing said at least one pair of zero crossing points when output from a frequency equalizer.

86. A method of preventing an inversion phenomena in a recovered frequency modulated signal wherein at least one pair of zero crossing points are missing, comprising the steps of:
 (a) suppressing the lower side band of the recovered frequency modulated signal to identify all zero crossing points;
 (b) developing a missing zero crossing point signal containing the missing zero crossing points from the recovered frequency modulated signal and the output of said step (a);
 (c) eliminating all portions of the missing zero crossing point signal not associated with the missing zero crossing points to produce a compensation pulse representing only missing zero crossing point pairs;
 (d) combining the compensation pulse with the recovered frequency modulated signal to inhibit the inversion phenomena.

87. The method of claim 86 wherein said step (d) combines only individual compensation pulses associated with missing zero crossing point pairs with the recovered frequency modulated signal.

88. The method of claim 86 wherein said step (c) includes the steps of,
(i) delaying said missing zero crossing point signal, and
(ii) logically ANDing the missing zero crossing point signal and the delayed missing zero crossing point signal,
said step (c) isolating pulses defining missing zero crossing points in the missing zero crossing point signal to remove phase shift producing short duration pulses, unrelated to missing zero crossing points, therefrom.

89. The method of claim 86 wherein said step (c) includes the steps of,
(i) filtering the missing zero crossing point identifying signal to attenuate high frequency components therefrom, and
(ii) slicing a portion of the filtered missing zero crossing point identifying signal around each missing zero crossing point pair to form at least one phase corrected compensation pulse.

90. The method of claim 86 wherein said step (c) includes the steps of,
(i) filtering the missing zero crossing point identifying signal to attenuate high frequency components therefrom, and
(ii) comparing the filtered missing zero crossing point identifying signal with a threshold to remove phase shift producing short duration pulses, unrelated to missing zero crossing points, therefrom, to form at least one phase corrected compensation pulse.

91. The method of claim 86 wherein said step (d) includes the step of (i) adding the individual compensation pulses produced by said step (c) to the recovered frequency modulated signal to produce a missing zero crossing point corrected frequency modulated signal.

92. The method of claim 86 wherein said step (d) includes the step of (i) logically exclusive ORing the individual compensation pulses produced by said step (c) with the recovered frequency modulated signal to produce a missing zero crossing point corrected frequency modulated signal.

93. The method of claim 86 wherein said step (d) includes the step of (i) comparing the recovered frequency modulated signal with at least one individual compensation pulse to produce a missing zero crossing point corrected frequency modulated signal.

94. The method of claim 86, wherein said recovered frequency modulated signal is missing said at least one pair of zero crossing points when output from a tape.

95. The method of claim 86, wherein said recovered frequency modulated signal is missing said at least one pair of zero crossing points when output from a frequency equalizer.

96. A system of preventing an inversion phenomenon in a recovered frequency modulated signal, resulting from a drop out of at least one zero crossing point, wherein at least one pair of zero crossing points are missing, comprising:

a compensation pulse generator for developing a missing zero crossing compensation signal for each missing pair of zero crossing points; and
a missing zero crossing insertion circuit supplementing the recovered frequency modulated signal with said missing zero crossing compensation signal only around each said pair of missing zero crossing points without substantially shifting zero crossing points present in the recovered frequency modulated signal to replace each said pair of missing zero crossing points without substantial reduction in the signal to noise ratio of the frequency modulated signal.

97. The system of claim 96 wherein said missing zero crossing insertion circuit adds compensation pulses to said recovered frequency modulated signal to produce a missing zero crossing point corrected signal which is not substantially phase shifted with respect to said recovered frequency modulated signal.

98. The system of claim 96 wherein said missing zero crossing insertion circuit includes a limiter at the output thereof.

99. The system of claim 96, wherein said recovered frequency modulated signal is missing said at least one pair of zero crossing points when output from a tape.

100. The system of claim 96, wherein said recovered frequency modulated signal is missing said at least one pair of zero crossing points when output from a frequency equalizer.

101. A method of preventing an inversion phenomenon in a recovered frequency modulated signal, resulting from a drop out of at least one zero crossing point, wherein at least one pair of zero crossing points are missing, comprising the steps of:
(a) developing a missing zero crossing compensation signal associated with each missing zero crossing point pair; and
(b) supplementing the recovered frequency modulated signal with the missing zero crossing compensation signal only around each pair of missing zero crossing points, without substantially shifting zero crossing points present in the recovered frequency modulated signal, to replace each pair of missing zero crossing points without substantial reduction in the signal to noise ratio of the frequency modulated signal.

102. The method of claim 101 wherein said step (b) adds compensation pulses to said recovered frequency modulated signal to produce a missing zero crossing point corrected signal which is not substantially phase shifted with respect to the recovered frequency modulated signal.

103. The method of claim 101 wherein said step (b) includes the step of (i) limiting the supplemented recovered signal.

104. The method of claim 101, wherein said recovered frequency modulated signal is missing said at least one pair of zero crossing points when output from a tape.

105. The method of claim 101, wherein said recovered frequency modulated signal is missing said at least one pair of zero crossing points when output from a frequency equalizer.

* * * * *